US012563177B2

(12) United States Patent (10) Patent No.: US 12,563,177 B2
Jo (45) Date of Patent: Feb. 24, 2026

(54) ELECTRONIC DEVICE AND OPERATING METHOD THEROF

(71) Applicant: Samsung Electronics Co., Ltd., Suwon-si (KR)

(72) Inventor: Jiyoon Jo, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 16 days.

(21) Appl. No.: 18/412,882

(22) Filed: Jan. 15, 2024

(65) Prior Publication Data

US 2024/0244160 A1 Jul. 18, 2024

(30) Foreign Application Priority Data

Jan. 18, 2023 (KR) ........................ 10-2023-0007496

(51) Int. Cl.
*H04N 17/00* (2006.01)
(52) U.S. Cl.
CPC ................................. *H04N 17/004* (2013.01)
(58) Field of Classification Search
CPC ........... H04N 17/004; H04N 21/43615; H04N 21/43635; H04N 21/44231; H04N 21/4425; G09G 5/006; G09G 2370/12; G09G 5/00; G09G 2370/06
See application file for complete search history.

(56) References Cited

U.S. PATENT DOCUMENTS 7,908,405 B2 3/2011 Yung et al.
8,260,977 B2 9/2012 Terauchi et al.

| | | | |
|---|---|---|---|
| 8,453,008 B2 | 5/2013 | Kimoto | |
| 8,619,193 B2 | 12/2013 | Kimoto et al. | |
| 8,788,718 B2 | 7/2014 | Lida et al. | |
| 9,819,995 B2 | 11/2017 | Park et al. | |
| 9,942,605 B2 | 4/2018 | Lee et al. | |
| 10,892,966 B2 * | 1/2021 | Sanders | .................. H04L 43/50 |
| 2009/0285138 A1 * | 11/2009 | Thomas | ........... H04N 21/42204 |
| | | | 370/310 |
| 2010/0231795 A1 | 9/2010 | Choi | |
| 2011/0090400 A1 * | 4/2011 | Huang | ................... G09G 5/006 |
| | | | 348/554 |
| 2012/0050551 A1 * | 3/2012 | Ishibashi | .......... H04N 21/43635 |
| | | | 348/208.1 |
| 2012/0249890 A1 * | 10/2012 | Chardon | .......... H04N 21/43635 |
| | | | 348/734 |
| 2017/0288895 A1 * | 10/2017 | Marino | ............... G06F 13/4022 |
| 2017/0364401 A1 * | 12/2017 | Huang | ................ G06F 11/0748 |
| 2019/0372874 A1 * | 12/2019 | Sanders | ................... H04L 1/203 |
| 2019/0373313 A1 * | 12/2019 | Jackson | .............. G06F 3/04847 |
| 2022/0150584 A1 * | 5/2022 | Jatti | .................... H04N 21/4396 |

* cited by examiner

*Primary Examiner* — Farley Abad
(74) *Attorney, Agent, or Firm* — Harness, Dickey & Pierce, P.L.C.

(57) ABSTRACT

Provided are an electronic device and an operating method thereof. The operating method of the electronic device configured to communicate with one or more source devices through a high-definition multimedia interface (HDMI) includes identifying a consumer electronics control (CEC) error corresponding to one or more source devices based on CEC communication status between the electronic device and the one or more source devices, analyzing the identified CEC error corresponding to the one or more source devices, and providing a troubleshooting information to a user of the electronic device regarding the identified CEC error corresponding to the one or more source devices.

20 Claims, 15 Drawing Sheets

FIG. 3

IDENTIFY CEC ERROR OF AT LEAST ONE SOURCE DEVICE THROUGH CEC — S10

ANALYZE ERRORS OF EACH SOURCE DEVICE BY USING DESIRED IDENTIFICATION ALGORITHM — S20

BASED ON ANALYZED RESULT, PROVIDE GUIDELINE FOR SOLVING CEC ERROR OF EACH SOURCE DEVICE — S30

FIG. 6

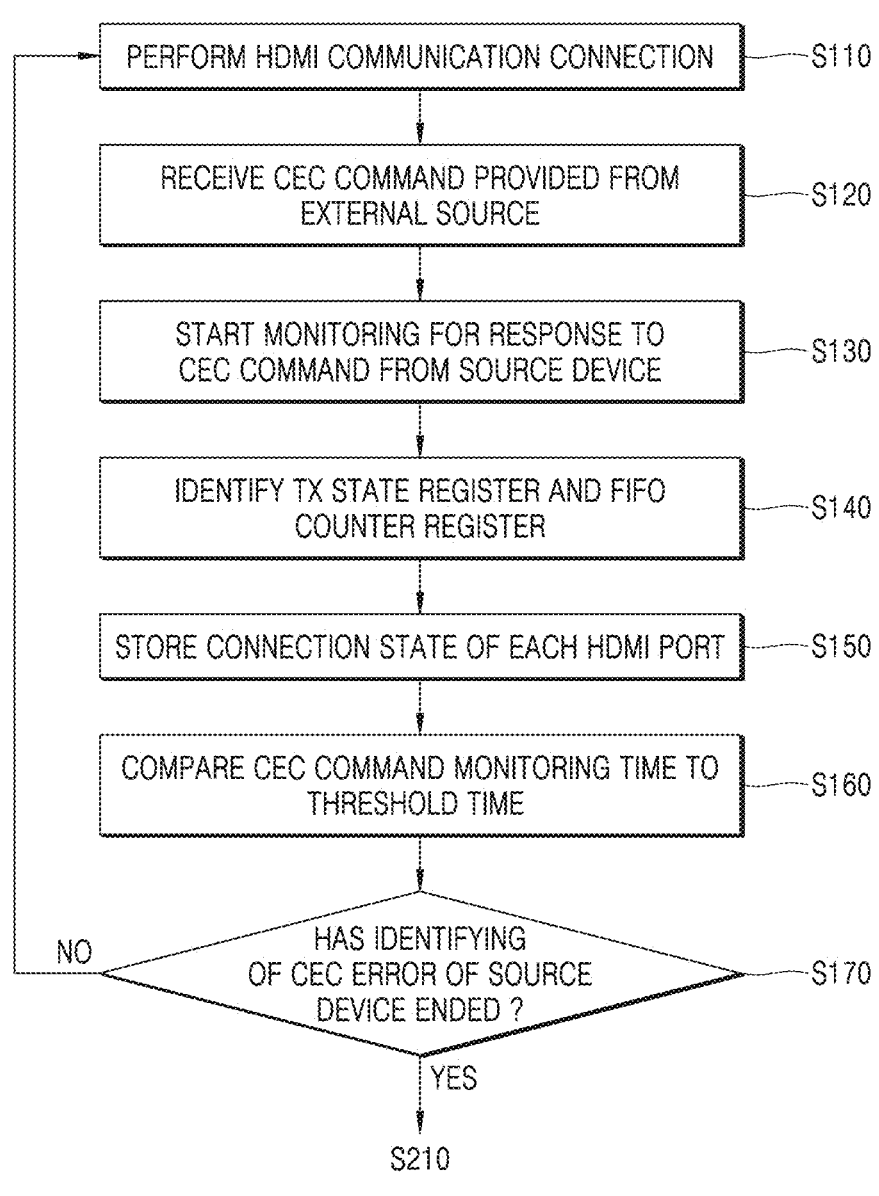

PERFORM HDMI COMMUNICATION CONNECTION —— S110

RECEIVE CEC COMMAND PROVIDED FROM EXTERNAL SOURCE —— S120

START MONITORING FOR RESPONSE TO CEC COMMAND FROM SOURCE DEVICE —— S130

IDENTIFY TX STATE REGISTER AND FIFO COUNTER REGISTER —— S140

STORE CONNECTION STATE OF EACH HDMI PORT —— S150

COMPARE CEC COMMAND MONITORING TIME TO THRESHOLD TIME —— S160

HAS IDENTIFYING OF CEC ERROR OF SOURCE DEVICE ENDED ? —— S170

NO

YES

Figure 12:
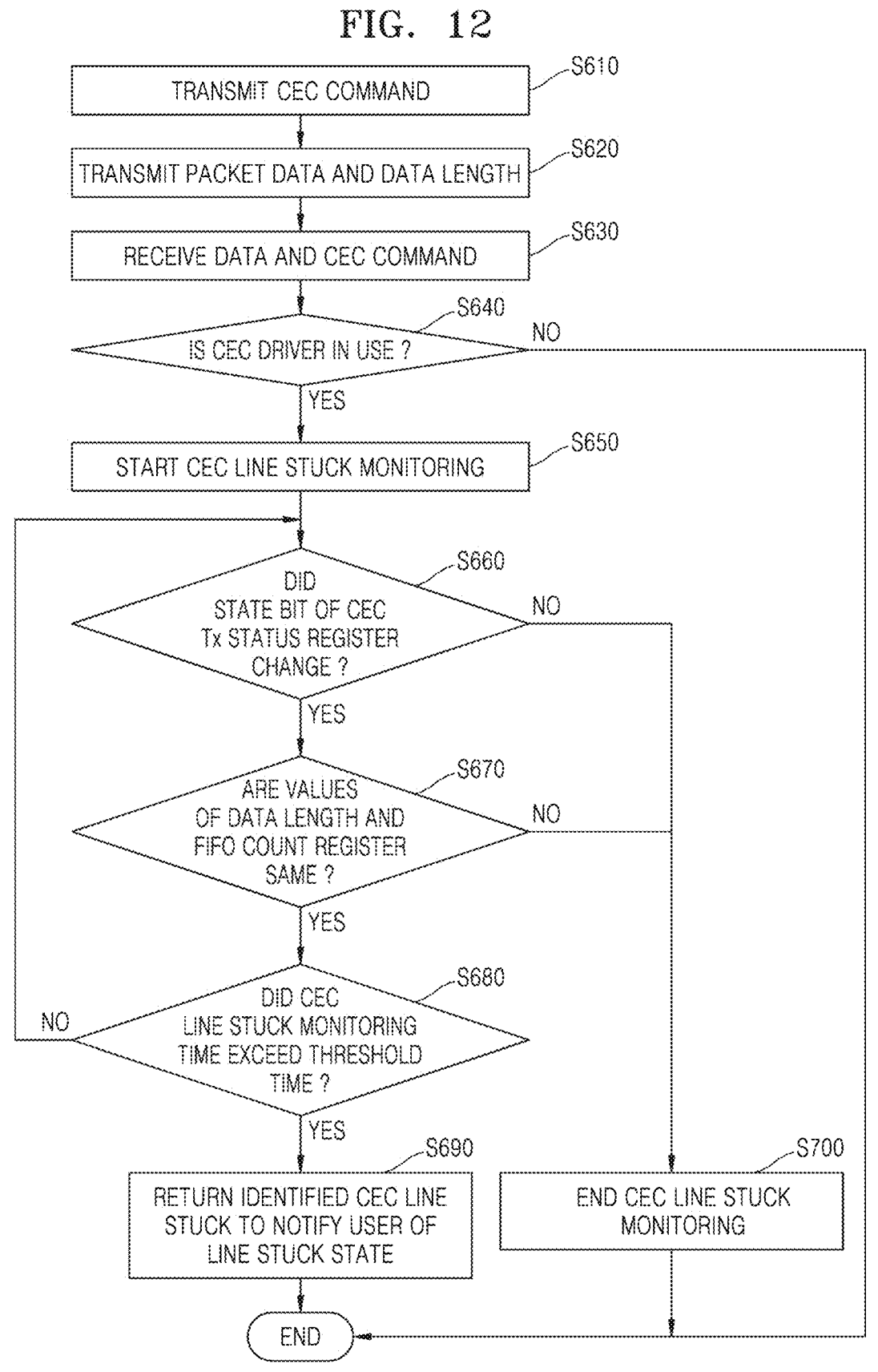

TRANSMIT CEC COMMAND — S610

TRANSMIT PACKET DATA AND DATA LENGTH — S620

RECEIVE DATA AND CEC COMMAND — S630

S640 — IS CEC DRIVER IN USE ? — NO

YES

START CEC LINE STUCK MONITORING — S650

S660 — DID STATE BIT OF CEC Tx STATUS REGISTER CHANGE ? — NO

YES

S670 — ARE VALUES OF DATA LENGTH AND FIFO COUNT REGISTER SAME ? — NO

YES

S680 — DID CEC LINE STUCK MONITORING TIME EXCEED THRESHOLD TIME ? — NO

YES

RETURN IDENTIFIED CEC LINE STUCK TO NOTIFY USER OF LINE STUCK STATE — S690

END CEC LINE STUCK MONITORING — S700

END

ELECTRONIC DEVICE AND OPERATING METHOD THEROF

CROSS-REFERENCE TO RELATED APPLICATION

This U.S. non-provisional application claims the benefit of priority under 35 U.S.C. § 119 to Korean Patent Application No. 10-2023-0007496, filed on Jan. 18, 2023, in the Korean Intellectual Property Office, the disclosure of which is incorporated by reference herein in its entirety.

BACKGROUND

Various example embodiments of the inventive concepts relate to an electronic device, and more particularly, to an electronic device, a system including the electronic device, and/or an operating method of the electronic device, etc., wherein the electronic device is configured to identify a consumer electronics control (CEC) error of a source device by using a CEC command, analyze the CEC error of each source device, and provide a problem solution guideline to a user.

High-definition multimedia interface (HDMI) is a digital video/audio interface standard. HDMI provides interfaces between "sink" devices which output content provided over the HDMI interface, such as audio/video (AV) devices, monitors, and/or digital televisions, etc., and "source" devices, such as set-top boxes, graphics cards, Blu-ray players, etc., which provide content to be played by the sink devices over the HDMI interface.

When a sink device accesses a source device through an HDMI cable, the sink device transmits a signal notifying the sink device that it is connected to the source device. When the source device identifies the signal transmitted from the sink device and is activated, the source device may transmit content that may be supported by the sink device, and accordingly, the sink device may normally output the content.

However, in some cases, even if a proper signal is received by the source device, the source device may not properly identify the signal. That is, because each source device has a different protocol (e.g., a different implementation of the HDMI standard), some source devices may not identify the signal transmitted from the sink device and may thus not be activated. In this case, even if the source device does not transmit any signal and/or transmit content to the sink device, a video signal and/or audio signal transmitted from the source device may not be properly output by the sink device.

SUMMARY

Various example embodiments of the inventive concepts provide an electronic device, a system including the electronic device, and/or an operating method of the electronic device, etc., wherein the electronic device is configured to identify and analyze a consumer electronics control (CEC) error of a source device and provide a guideline to solve the CEC error.

According to at least one example embodiment of the inventive concepts, there is provided an operating method of an electronic device configured to communicate with one or more source devices through a high-definition multimedia interface (HDMI), wherein the method includes identifying a consumer electronics control (CEC) error corresponding to one or more source devices based on CEC communication status between the electronic device and the one or more source devices, analyzing the identified CEC error corresponding to the one or more source devices, and providing a troubleshooting information to a user of the electronic device regarding the identified CEC error corresponding to the one or more source devices.

According to at least one example embodiment of the inventive concepts, there is provided an electronic device configured to communicate with one or more source devices through an HDMI, wherein the electronic device includes a nonvolatile memory configured to store a consumer electronic control (CEC) command received from an external source, a volatile memory configured to temporarily store the CEC command, and processing circuitry configured to identify a CEC error of the one or more source devices based on the loaded CEC command, the processing circuitry including a transmission state register configured to store a state of the CEC command, and a first-in-first-out (FIFO) count register configured to count a number of responses to the CEC command received from the one or more source devices, and the processing circuitry is further configured to, identify the CEC error of the one or more source devices by comparing results output on the transmission state register associated with the CEC command and the FIFO count register, analyzes the identified error corresponding to the one or more source devices, and based on a result of the analyzing, provides troubleshooting information to a user of the electronic device regarding the identified CEC error corresponding to the one or more source devices.

According to at least one example embodiment of the inventive concepts, there is provided an operating method of an electronic device, the electronic device configured to communicate with a first source device and a second source device through a high-definition multimedia interface (HDMI), the method including identifying a consumer electronic control (CEC) error of the first source device and the second source device based on the CEC communication between the electronic device and the first source device and the second source device, analyzing the identified CEC errors of the first source device and the second source device, and providing troubleshooting information to a user of the electronic device regarding the identified CEC errors of the first source device and the second source device.

BRIEF DESCRIPTION OF THE DRAWINGS

Various example embodiments will be more clearly understood from the following detailed description taken in conjunction with the accompanying drawings in which:

FIG. 3 is a diagram for explaining an interface between a source device and a sink device in an HDMI system, according to at least one example embodiment of the inventive concepts;

FIG. 6 is a flowchart for explaining a method, performed by the sink device, of identifying a CEC error of one or more source devices, according to at least one example embodiment of the inventive concepts;

FIG. 12 is a flowchart for explaining a method, performed by the sink device, of identifying a CEC error of one or more source devices, according to at least one example embodiment of the inventive concepts;

DETAILED DESCRIPTION

Hereinafter, various example embodiments of the inventive concepts will be described in detail with reference to the accompanying drawings.

Figure 1:
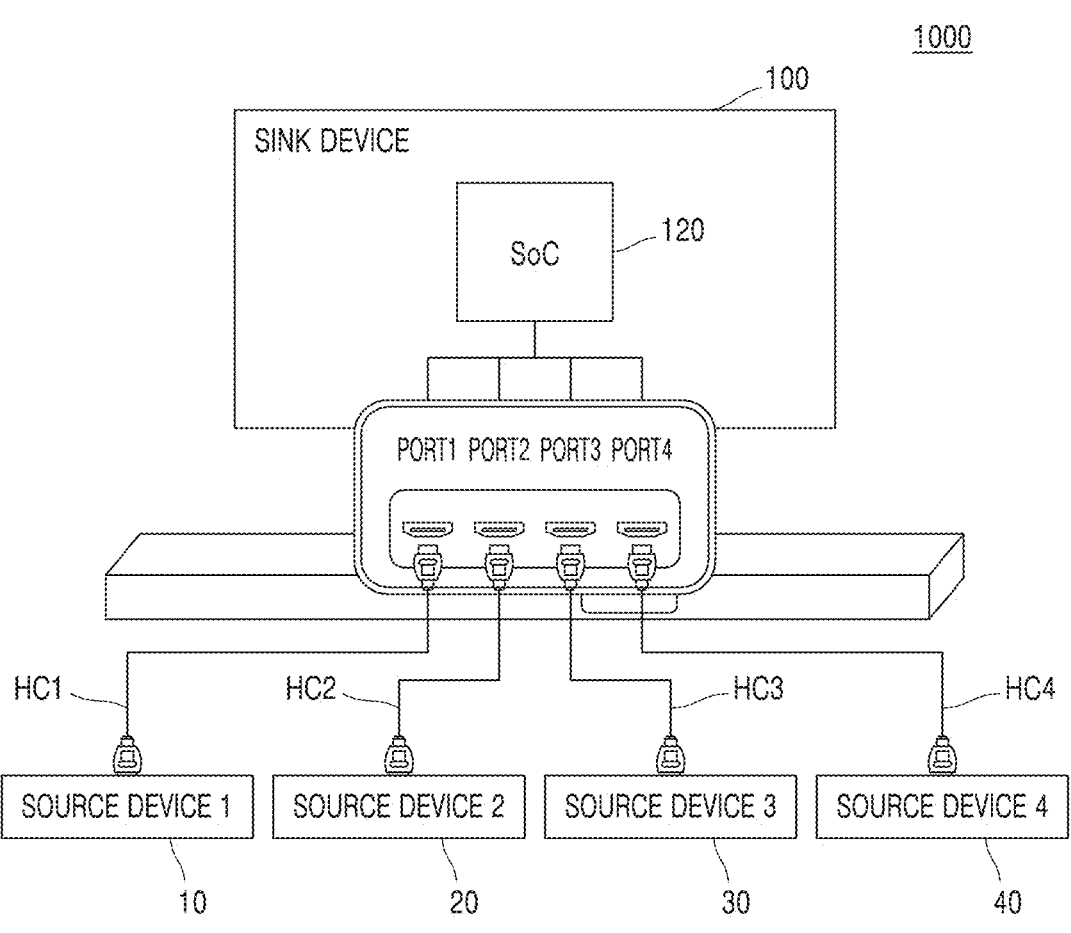
FIG. 1 is a diagram for explaining a high-definition multimedia interface (HDMI) system in which a sink device and one or more source devices communicate through an HDMI, according to at least one example embodiment of the inventive concepts.

FIG. 1 is a diagram for explaining a high-definition multimedia interface (HDMI) system 1000 including at least one sink device 100 communicating with at least one source device 10, 20, 30, and/or 40, etc., through an HDMI interface, but the example embodiments are not limited thereto, and for example, the HDMI system 1000 may include a greater or lesser number of constituent components, etc.

Referring to FIG. 1, the HDMI system 1000 may include a plurality of source devices 10, 20, 30, and 40, the sink device 100, a plurality of ports Port1 to Port 4, and/or a plurality of HDMI cables HC1 to HC4, etc., but is not limited thereto.

The sink device 100 may be connected with the plurality of source devices 10, 20, 30, and 40 (hereinafter, also referred to as first to fourth source devices 10, 20, 30, and 40) through the plurality of HDMI cables HC1 to HC4, respectively. For example, in the sink device 100, a first source device 10 may be connected with a first port Port1 through a first HDMI cable HC1, a second source device 20 may be connected with a second port Port2 through a second HDMI cable HC2, a third source device 30 may be connected with a third port Port3 through a third HDMI cable HC3, and a fourth source device 40 may be connected with a fourth port Port4 through a fourth HDMI cable HC4, etc., but the example embodiments are not limited thereto.

The sink device 100 may include at least one system on chip (SoC) 120, but is not limited thereto. Examples of the SoC 120 are described below with reference to FIGS. 2 and 3.

The plurality of source devices 10, 20, 30, and 40 may be electronic devices that provide their own content data and/or are provided with content data from the outside (e.g., an external source, etc.). The plurality of source devices 10, 20, 30, and 40 may be implemented in various forms, such as optical media players (e.g., a digital versatile disc (DVD) player, a Blu-ray player, an ultra high-definition (UHD) player, etc.,), a set-top box, a television (TV), a personal computer, a mobile device, a game console device, a content server, a smart device, a streaming device, etc., but the example embodiments are not limited thereto. Content data may include video data and/or audio data. Content data may be referred to as a content signal, video data may be referred to as a video signal, and audio data may be referred to as an audio signal.

The HDMI uses a method of transmitting digital audio signals and/or digital video signals at the same time with a single cable. The plurality of HDMI cables HC1 to HC4 may be uncompressed digital cables that transmit content without compression to the sink device 100. A connector may be provided at either end (or both ends) of the plurality of HDMI cables HC1 to HC4, and the connector may be connected with a port provided at each of the sink device 100 and the plurality of source devices 10, 20, 30, and 40 so that at least one signal (e.g., content signal, audio signal, and/or video signal, etc.) may be transmitted between the sink device 100 and the source device 10 by using HDMI transmission standard (e.g., HDMI communication protocol, etc.).

The sink device 100 may be an electronic device for processing (e.g., generating, etc.) and/or reproducing (e.g., displaying, outputting, etc.) content data transmitted from the source device 10. Here, the term "reproduction" may refer to displaying an image according to and/or based on processed video data, outputting audio according to and/or based on processed audio data, and/or both displaying an image based on the processed video data and playing audio based on the audio data, etc. The sink device 100 may be implemented in various forms such as a TV, a monitor, a portable multimedia player, a mobile phone, a tablet, an electronic frame, an electronic blackboard, an electronic billboard, etc., but is not limited thereto FIG. 2 is a diagram for explaining an HDMI system according to at least one example embodiment of the inventive concepts.

Figure 2:
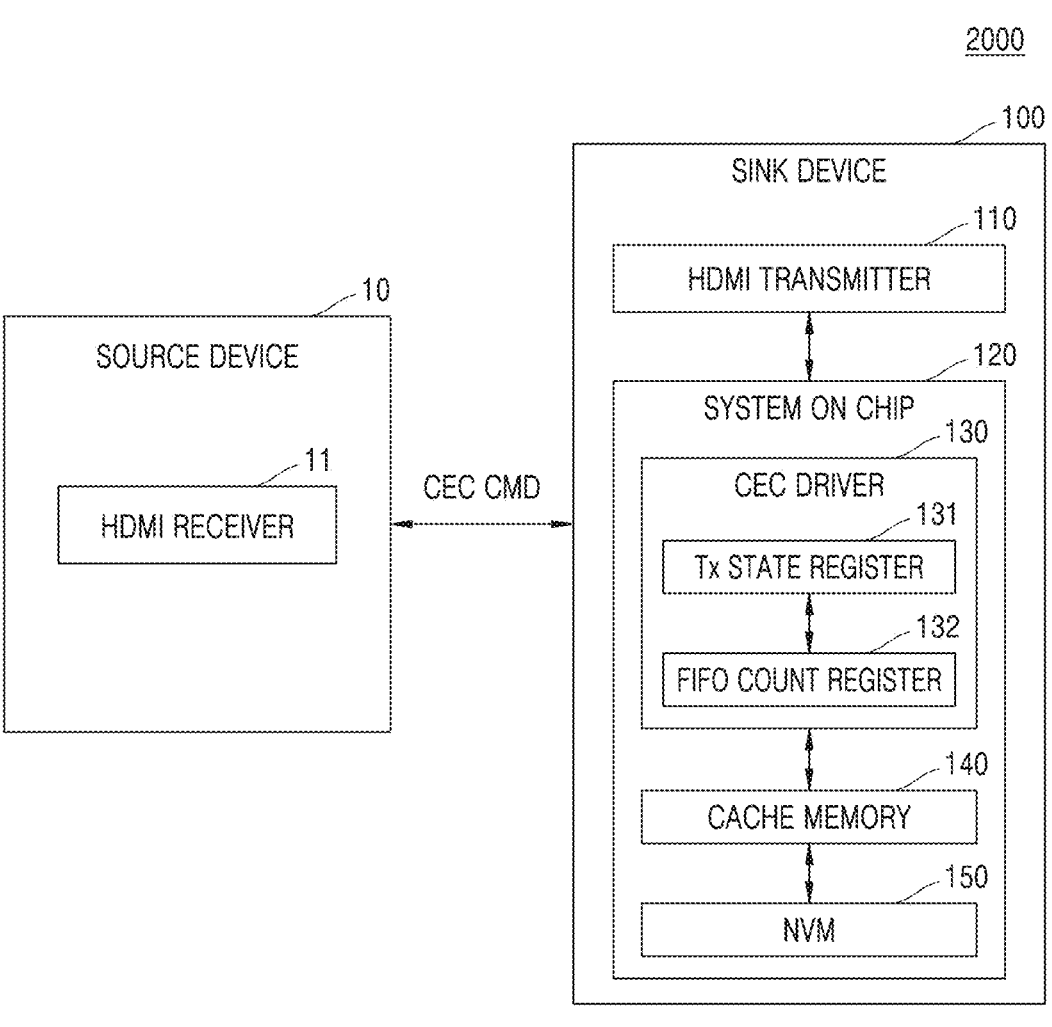
FIG. 2 is a diagram for explaining an HDMI system according to at least one example embodiment of the inventive concepts.

Referring to FIG. 2, an HDMI system 2000 may include the source device 10 and the sink device 100, but is not limited thereto. The HDMI system 2000 may correspond to the HDMI system 1000 shown in FIG. 1, and the source device 10 may correspond to the first source device 10 shown in FIG. 1, but the example embodiments are not limited thereto.

The source device 10 may include an HDMI receiver 11. The HDMI receiver 11 may act as a communication interface. For example, the HDMI receiver 11 may transmit at least one content signal to the sink device 100. In at least one example embodiment, the HDMI receiver 11 may receive at least one signal from the sink device 100 based on the HDMI transmission standard. The HDMI transmission standard has been released up to version 2.1a, but the example embodiments are not limited thereto and may be used with other version of the HDMI standard. HDMI 2.1a may be regulated to transmit a content signal having higher resolution than that of the previous version, for example, a content signal having an 8 K resolution. If an 8 K image is to be displayed in the sink device 100, not only the sink device 100 but also the source device 10 need to support HDMI 2.1a, but the example embodiments are not limited thereto.

Although not shown, the source device 10 may further include a user input device to be operated by a user, a memory to store data, a processor to process data, and a communicator (e.g., communication interface, etc.) to transmit and/or receive data to and/or from the sink device 100. According to some example embodiments, the processor, HDMI receiver 11, user input device, and/or communicator, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The sink device 100 may be an electronic device that communicates with the source device 10 through the HDMI cable.

In at least one example embodiment, the sink device 100 may include an HDMI transmitter 110 and an SoC 120, etc., but is not limited thereto.

The HDMI transmitter 110 may transmit content data to the source device 10.

The SoC 120 may identify whether the source device 10 supports at least one consumer electronics control (CEC) operation through the CEC driver 130. Examples of the CEC are described in detail with reference to FIG. 3. If it is identified that the source device 10 supports the CEC operation, the sink device 100 may sequentially and/or simultaneously transmit a CEC command CEC CMD (e.g., power on, power off, volume up, volume down, mute, device priority, device menu control, routing control, system information, system standby, etc.) to the source device 10 through the CEC driver 130. For example, referring to FIG. 1, the sink device 100 may sequentially and/or simultaneously transmit a CEC command CEC CMD to the first source device 10, the second source device 20, the third source device 30, and/or the fourth source device 40 through the CEC driver 130, etc., but the example embodiments are not limited thereto.

The SoC 120 may include the CEC driver 130, a cache memory 140, and/or a nonvolatile memory 150, etc., but is not limited thereto.

The nonvolatile memory 150 may receive the CEC command CEC CMD provided from the outside (e.g., external source, etc.). For example, the CEC command CEC CMD may be provided by a user's communication device, etc. (e.g., a smartphone), separately from the sink device 100 and the source device 10, etc., but is not limited thereto. The nonvolatile memory 150 may be implemented as nonvolatile memory that stores data independently of a supply of power. The nonvolatile memory may include flash memory, read only memory (ROM), erasable programmable read-only memory (EPROM), electrically erasable programmable read-only memory (EEPROM), etc. The flash memory may include, for example, NAND Flash Memory, NOR Flash Memory, etc.

The cache memory 140 may temporarily store the CEC command CEC CMD. The cache memory 140 may be implemented as a volatile memory that operates (e.g., stores data) only when power is supplied to the external device. A volatile memory may include, for example, dynamic random access memory (DRAM), static random access memory (SRAM), etc.

The CEC driver 130 may include a transmission state register 131 and a first-in-first-out (FIFO) count register 132, but is not limited thereto. The CEC driver 130 may further include a control circuit (e.g., control processing circuitry, control circuitry, etc.) configured to communicate with the transmission state register 131 and/or the FIFO count register 132, but is not limited thereto.

The CEC driver 130 may load the CEC command CEC CMD stored in the nonvolatile memory 150 on the cache memory 140. The CEC driver 130 may provide the loaded CEC command CEC CMD to one or more source devices 10 through at least one CEC line. For example, as a CEC operation support by the source device 10 is identified, the CEC driver 130 may sequentially and/or simultaneously transmit the CEC command CEC CMD corresponding to the cache memory 140 to one or more source devices 10 based on the CEC command CEC CMD stored in the nonvolatile memory 150. The CEC driver 130 may identify a CEC error of the one or more source devices by providing the CEC command CEC CMD to the one or more source devices. The specific method of identifying the CEC error of the one or more source devices is described below with reference to FIGS. 4 to 6. In describing one or more of the example embodiments of the inventive concepts, identifying the CEC error may refer to identifying a CEC line stuck state, and accordingly, phrases such as identifying the CEC error of the source device 10 and identifying the CEC line stuck state of at least one source device 10 may both be used. The transmission state register 131 may store the state of the CEC command CEC CMD. For example, the transmission state register 131 may store the connection state of each HDMI port of each source device (e.g., whether a HDMI device (e.g., sink device or source device) has been connected to the respective HDMI port, etc.), but is not limited thereto. The FIFO count register 132 may count the number of CEC command CEC CMD transmitted to each HDMI port of each source device. For example, the FIFO count register 132 may count the number of CEC command CEC CMD stored in the transmission state register 131, etc.

The CEC driver 130 may control the communication between the transmission state register 131 and the FIFO count register 132. The CEC driver 130 may compare results output from the transmission state register 131 and the FIFO count register 132 to identify the CEC error of the one or more source devices. Because the CEC driver 130 identifies the CEC error of the one or more source devices, the CEC driver 130 may analyze the CEC error of each source device 10 by using a desired and/or predetermined identification algorithm. The CEC driver 130 may provide a guideline (e.g., instructions, etc.) for solving (e.g., resolving, remedying, troubleshooting, etc.) the CEC error of each source device 10 based on the analyzed results, etc.

For example, the CEC driver 130 may receive the CEC command CEC CMD provided from the outside (e.g., external source, etc.). The CEC driver 130 may start monitoring the received CEC command CEC CMD. For example, the CEC driver 30 may compare a CEC command CEC CMD monitoring time to a desired threshold time for each source device 10. The CEC driver 130 may identify an error of the source device 10 that received the CEC command CEC CMD after the monitoring time exceeded the desired threshold time, etc. In other words, the CEC driver 130 may determine whether an error has occurred in the source device 10 and/or the source device 10 is in an error state based on whether the source device 10 has received the CEC command CEC CMD within the desired threshold time.

For example, the CEC driver 130 may identify whether the source device 10 is toggleable, thereby identifying the error of the source device 10 that received the CEC command CEC CMD when the monitoring time exceeds the desired threshold time. For example, the CEC driver 130 may determine whether the power to the source device 10 may be toggled on or off (e.g., the power received by the source device 10 from the external source may be turned on or off) and/or determine whether the source device 10 may perform a repetitive operation and/or repeatable operation, such as transmitting and/or providing current and/or voltage to a sink device through an HDMI cable, transmitting and/or providing CEC commands to the sink device through the HDMI cable, etc., but the example embodiments are not limited thereto and other forms of toggleable functions of the source device 10 may be determined by the CEC driver 130. The CEC driver 130 may identify a bit value (e.g., flag bit, etc.) assigned to the CEC command CEC CMD to identify whether the CEC error has occurred, but is not limited thereto.

The CEC driver 130 may determine whether the CEC error has occurred in an already connected source device (e.g., a currently connected source device, a previously connected source device, etc.). The CEC driver 130 may output interface information (e.g., error status information, etc.) to notify a user of the CEC error which has occurred in the currently connected source device and whether or not to select the solution sequence (e.g., instructions for remedying and/or troubleshooting the CEC error) according to and/or based on the identified results. The CEC driver 130 may also identify whether the error is the CEC error of a newly connected source device. The CEC driver 130 may output interface information to notify a user whether the CEC error has occurred in association with the newly connected source device and whether or not to select the solution sequence according to and/or based on identified results, etc. In other words, the CEC driver 130 may notify users of the CEC error of each source device and output interface information that provides a solution sequence as desired and/or required.

In addition, the CEC driver 130 may output interface information (e.g., instruction information, remedy information, troubleshooting information, etc.) to notify the user to sequentially remove the HDMI cables connected to each of the already connected source devices. The CEC driver 130 may output interface information to notify the user to replace the HDMI cable connected to the source device in which the error is identified. The CEC driver 30 may identify whether the source device in which the error has been identified normally and/or properly operates after the HDMI cable is replaced by the user, etc. The CEC driver 130 may output interface information to notify the user that the source device in which the error has been notified is operating normally and/or properly, etc.

Although not shown, the sink device 100 may further include a user input device (e.g., a keyboard, mouse, touch-panel, etc.), a communicator (e.g., a communication device, etc.), a display, an audio system (e.g., speakers, etc.), etc., but is not limited thereto. In addition, although FIG. 2 illustrates that the source device 10 includes the HDMI receiver 11 and the sink device 100 includes the HDMI transmitter 110, the example embodiments are not limited thereto, and for example, the source device 10 may include an HDMI transmitter and the sink device 100 may include an HDMI receiver, etc. According to some example embodiments, HDMI transmitter 110, the SoC 120, the CEC driver 130, a cache memory 140, the nonvolatile memory 150, user input device, and/or communicator, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

In a sink device 100 according to at least one example embodiment of the inventive concepts, the CEC error of a source device may be identified using the CEC command. When the CEC error is identified in the source device, the sink device 100 may analyze whether the CEC error has occurred in any additional source devices, and may provide a corresponding guideline (e.g., error information, remedy instructions, troubleshooting instructions, etc.) for the user to solve the CEC error. Therefore, service response costs may be reduced by providing guidelines for solving and/or troubleshooting the identified CEC errors to users, etc.

In addition, because the sink device 100 according to at least one example embodiment of the inventive concepts may identify the CEC error of the source device in real time, it is possible to decrease and/or prevent the user's confusion and/or frustration (e.g., increase the user's satisfaction) and/or decrease and/or prevent the device malfunctions, etc.

Figure 3:
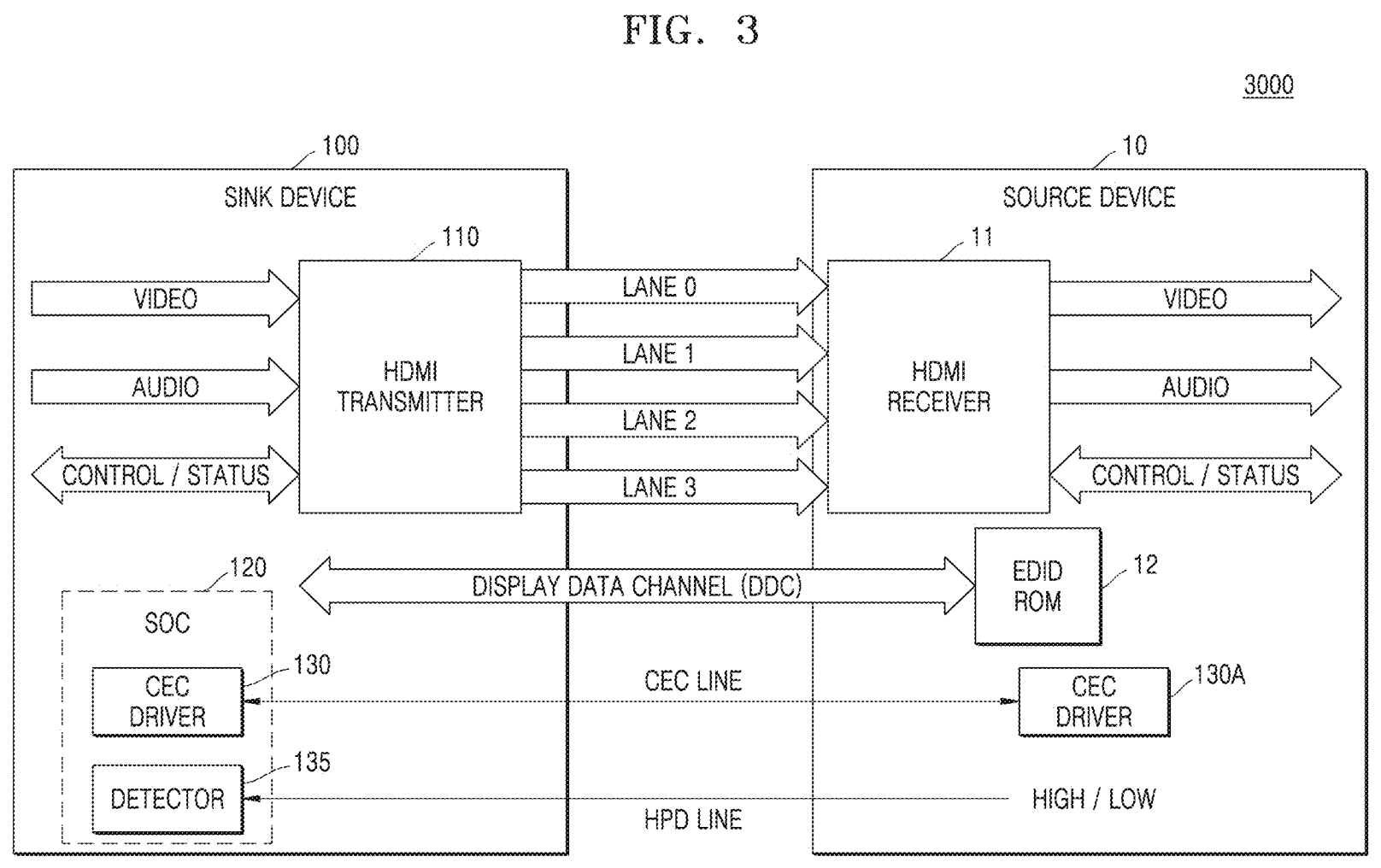

FIG. 3 is a diagram for explaining an interface between a source device and a sink device in an HDMI system 3000 according to at least one example embodiment of the inventive concepts.

Referring to FIG. 3, the HDMI system 3000 may correspond to the HDMI system 1000 shown in FIG. 1, and the source device 10 may correspond to the first source device 10 shown in FIG. 1, but the example embodiments are not limited thereto.

The HDMI transmission standard applied to the HDMI system 1000 according to at least one example embodiment of the inventive concepts may be HDMI 2.1a, but is not limited thereto, and for example, the example embodiments may be applied to earlier versions of the HDMI transmission standard and/or may be applied to later versions of the HDMI transmission standard. HDMI 2.1a has some different points, although the basic structure thereof is similar to previous versions. HDMI 2.1a may provide a transmission bandwidth of 48 Gbps, which is 2.5 or more times greater than that of HDMI 2.0 of which the transmission bandwidth is 18 Gbps. Specifically, HDMI 2.1a may support a total of six transmission bandwidths, which are 48 Gbps (e.g., 12 Gbps per lane (or channel), where 4 lanes are driven), 40 Gbps (e.g., 10 Gbps per lane, where 4 lanes are driven), 32 Gbps (e.g., 8 Gbps per lane, where 4 lanes are driven), 24 Gbps (e.g., 6 Gbps per lane, where 4 lanes are driven), 18 Gbps (e.g., 6 Gbps per lane, where 3 lanes are driven), and 9 Gbps (e.g., 3 Gbps per lane, where 3 lanes are driven). HDMI 2.1a may transmit high dynamic range (HDR) video content encoded in, e.g., 10-bit colors and 4 K resolution and 144 Hz refresh rate, and may support uncompressed video transmission thereof from 8 K resolution with 30 Hz refresh rate, etc. The HDMI version prior to HDMI 2.1a (e.g., HDMI 2.0, etc.) may transmit content signals through three channels. Particularly, the version prior to HDMI 2.1a uses three channels among four total channels for data channels, and one channel is used as a clock channel. That is, in HDMI 2.1a, TMDS Channel 3, which is a data channel, is used as a clock channel in the HDMI version prior to HDMI 2.1a (e.g., HDMI 2.0). HDMI 2.1a transmits the content signal through four channels and does not include a separate clock channel that transmits the clock signal. Instead, clock signals are embedded in data signals in HDMI 2.1a. Thus, a data transmission rate according to HDMI 2.1a is much higher than that of the version before HDMI 2.1a.

In HDMI, the transition-minimized differential signaling (TMDS) may be used in the physical layer. High-bandwidth digital content protection (HDCP) may be used for encryption of signals for content security. Extended display identification data (EDID) may be used for inter-device authentication. Consumer electronics control (CEC) may be used to access a control system of the whole system.

The HDMI cable and connectors may include four differential pairs including four TMDS channels, e.g., TMDS Channel 0, TMDS Channel 1, TMDS Channel 2, and TMDS Channel 3, for transmitting data. The channels may be used to transmit video data, audio data, and auxiliary data, and/or to transmit a pattern signal to the source device 10 during fixed rate link (FRL) training. The term "channel" may be referred to as a "lane". The sink device 100 may include the HDMI transmitter 110 to transmit content data to the source device 10, and the source device 10 may include the HDMI receiver 11 to receive the content data from the sink device 100, but the example embodiments are not limited thereto.

The HDMI transmitter 110, HDMI receiver 11, and/or HDMI cables, etc., may include at least one display data channel (DDC), which is an inter-integrated circuit (I2C)-based communication channel. The DDC may be an I2C-based communication standard for exchanging information between the source device 10 and the sink device 100. The DDC may be used to determine the performance and/or characteristics of the source device 10 and/or the sink device 100. For example, the source device 10 may obtain an EDID stored in memory, e.g., the EDID ROM, etc., of the sink device 100 through the DDC and may identify the performance level of the sink device 100 according to and/or based on the obtained EDID. Particularly, the sink device 100, as an I2C secondary device, may load an EDID value on a desired and/or predefined address (e.g., 0xA0/0xA1) to prepare communication, and after the preparation is completed, the source device 10, as an I2C primary device, may read EDID information of the corresponding address through the DDC communication, but the example embodiments are not limited thereto.

The CEC driver 130 may be used to provide high-level control functions (e.g., CEC commands, CEC instructions, etc.) between various audio and video (AV) products in the system connected using HDMI connections. For example, the CEC driver 130 may connect and/or control all of the source devices 10 and/or sink devices 100 in the system with one control line (e.g., control channel, etc.), but is not limited thereto. Compared to the DDC that forms one-on-one connections between one of the source devices 10 and one sink device 100 as shown in FIG. 1, the CEC driver 130 connects all the devices (e.g., the sink device 100 and source devices 10 to 40 as shown in FIG. 1) in the system, but the example embodiments are not limited thereto. For example, the CEC driver 130 may be used when all devices are to be controlled by one remote controller, but is not limited thereto. A port connection signal may be transmitted to the sink device 100 from one or more of the source devices 10 through the CEC line. The port connection signal may be a signal indicating that a connection between the source device 10 and the sink device 100 is continuously maintained without breaking and/or interruption, etc. An identifier (ID) signal to identify the source device 10 may be transmitted by the source device 10 to the sink device 100 through the CEC line, etc.

When a CEC error is identified in the source device 10 by the CEC driver 130 based on CEC communication, CEC commands, CEC instructions, CEC messages etc., transmitted (and/or not transmitted) between the source device 10 and the sink device 100, the sink device 100 may analyze and/or determine whether the CEC error has occurred in any additional source device. Additionally, the CEC driver 130 may provide a corresponding guideline (e.g., instructions, messages, etc.) for the user to solve, remedy, troubleshoot, etc., the CEC error. Response costs and/or repair costs may be reduced by providing guidelines for solving, remedying, troubleshooting, etc., the CEC errors to users immediately upon detection of a CEC error, etc.

An HDMI Ethernet and Audio Return Channel (HEAC) may be used to provide Ethernet-compatible data networking between connection devices and an audio return channel in a direction opposite to the TMDS. Ethernet-compatible data may be transmitted and/or received to and/or from the external source, the sink device 100, and/or the source device 10 through a utility line (e.g., a CEC Line) in the HEAC, but is not limited thereto.

According to at least one example embodiment, the sink device 100 may transmit a hot plug detect (HPD) signal using a detector 135 (e.g., plug detector circuitry, etc.) to the source device 10 through an HPD line to notify the source device 10 that the source device 10 is electronically connected to (e.g., plugged into) the sink device 100. Particularly, when the source device 10 is electrically connected to the sink device 100, the sink device 100 may change the signal level of the HPD signal from low (e.g., logical low) to high (e.g., logical high), etc.

A standard of a status and control data channel (SCDC) has been supported by the HDMI protocol since version 2.0 of the HDMI protocol. Same as the DDC, the SCDC is an I2C-based communication protocol. The SCDC is a one-on-one communication protocol that enables data exchange between at least one source device 10 and at least one sink device 100. SCDC uses the I2C standard to read EDID and other information. The SCDC may expand the I2C standard by providing a mechanism to the sink device 100 so that the sink device 100 may request the source device 10 to perform a status check. To this end, a new I2C address (e.g., 0xA8/0xa9) area may be assigned. Information regarding status and/or configuration may be exchanged through the SCDC. The sink device 100 including the SCDC has a valid HDMI HF-vendor-specific data block (VSDB) in the EDID and has a SCDC_Present bit value set to "1." Prior to the access of the SCDC, the source device 10 may identify whether the sink device 100 includes a valid HDMI HF-VSDB in the EDID in which the SCDC_Present bit value is set to "1." The source device 10 may not perform the access of the SCDC if the SCDC_Present bit value is not "1".

A standard of an ID communications channel (IDCC) has been supported by the HDMI protocol since version 2.1a of the HDMI protocol. Same as the DDC, the IDCC is an I2C-based communication protocol. The IDCC may be a communication protocol for a sink ID of the sink device 100 to be transmitted to the source device 10 and/or for a source ID of the source device 10 to be transmitted to the sink device 100, etc. The IDCC may be used to transmit a source ID, a sink ID, and/or a cable ID in both directions between adjacent devices. The IDCC uses the same I2C interface and address used to read E-EDID, etc.

Figure 4:
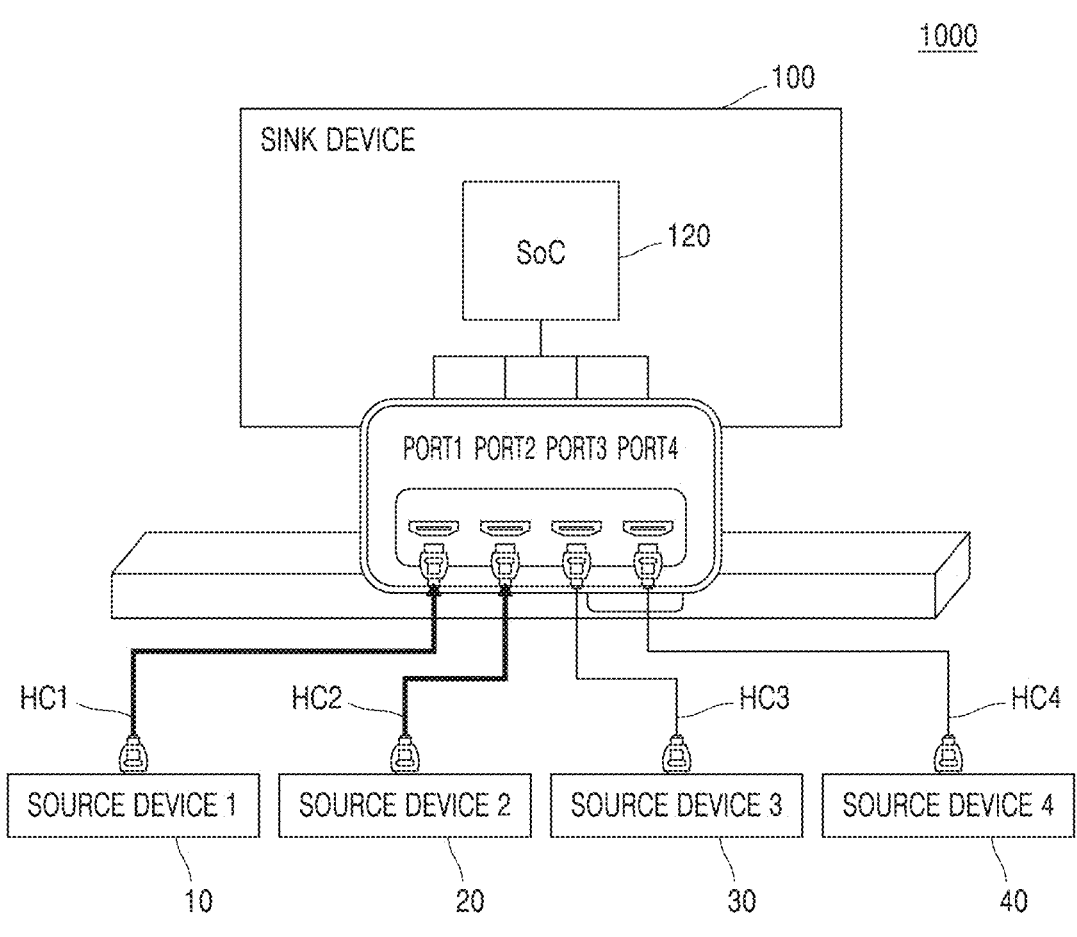
FIG. 4 is a diagram for explaining an HDMI system in which a sink device, a first source device, and a second source device communicate through an HDMI, according to at least one example embodiment of the inventive concepts.

FIG. 4 is a diagram for explaining an HDMI system in which an electronic device, a first source device, and a second source device communicate through the HDMI, according to at least one example embodiment of the inventive concepts, but the example embodiments are not limited thereto. Aspects of FIG. 4 that are described with reference to FIG. 1 are omitted.

Referring to FIG. 4, in the sink device 100, the first source device 10 may be connected with the first port Port1 through the first HDMI cable HC1, and the second source device 20 may be connected with the second port Port2 through the second HDMI cable HC2. The sink device 100 may include the SoC 120, but is not limited thereto.

The method of identifying the CEC error of the first source device 10 and/or the second source device 20 is described in detail with reference to FIGS. 5 to 12 which assume that the first source device 10 is already connected to the sink device 100 and the second source device 20 is newly connected with the sink device 100, but the example embodiments are not limited thereto.

In FIG. 4, each operation may be performed by each of the plurality of source devices, and a plurality of source devices may perform each operation at the same time, but the example embodiments are not limited thereto, and for example, some operations may be omitted by one or more of the source devices, and/or one or more of the source devices may perform the operations at different times, etc.

Figure 5:
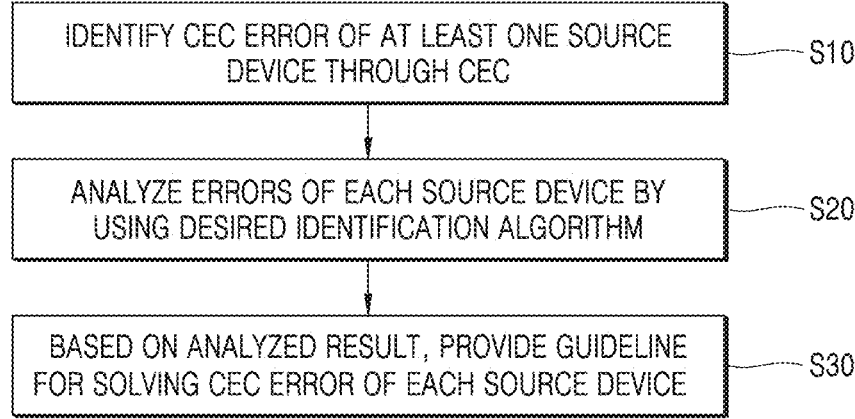
FIG. 5 is a flowchart illustrating an operating method of an electronic device according to at least one example embodiment of the inventive concepts.

FIG. 5 is a flowchart illustrating an operating method of an electronic device, according to at least one example embodiment of the inventive concepts.

Referring to FIG. 5, a sink device may identify a CEC error present in and/or associated with one or more source devices through at least one CEC operation (operation S10).

For example, referring to FIG. 2, as a CEC operation support by the source device 10 is identified, the CEC driver 130 may sequentially and/or simultaneously transmit the CEC command CEC CMD corresponding to and/or stored in the cache memory 140 to one or more source devices based on the CEC command CEC CMD stored in the nonvolatile memory, but the example embodiments are not limited thereto. The CEC driver 130 may identify a CEC error of the one or more source devices by providing the CEC command CEC CMD to the one or more source devices and determining whether the one or more source devices properly receives the CEC command CEC CMD, etc.

The sink device may analyze the CEC error of each source device by using a desired and/or predetermined identification algorithm (operation S20).

For example, referring to FIG. 2, the CEC driver 130 may compare results output from the transmission state register 131 and/or the FIFO count register 132 to identify the CEC error of one or more source devices 10. Because the CEC driver 130 identifies the CEC error of the one or more source devices, the CEC driver 130 may analyze the CEC error of each source device by using at least one desired and/or predetermined error identification algorithm. For example, the CEC driver 130 may identify whether the source device 10 is toggleable, thereby identifying an error of the source device 10 that received the CEC command CEC CMD during the monitoring time exceeding the threshold time, etc. The CEC driver 130 may identify a bit value assigned to the CEC command CEC CMD to identify whether the CEC error has occurred.

The sink device may provide a guideline (e.g., instructions, messages, etc.) to solve, remedy, and/or troubleshoot the CEC error of each source device based on an analysis result (operation S30).

For example, referring to FIG. 2, the CEC driver 130 may provide a guideline to solve, remedy, and/or troubleshoot the CEC error of each source device based on the analyzed result. The CEC driver 130 may notify users of the CEC error of each source device and output interface information that provides a solution sequence (e.g., troubleshooting instructions, troubleshooting messages, error information, device status information, etc.).

According to at least one example embodiment of the inventive concepts, the CEC error of the source device may be identified using a CEC command. When the CEC error is identified in the source device, the sink device may analyze whether the CEC error has occurred in any source device and may provide a corresponding guideline for the user to solve the CEC error, etc. Therefore, service response costs may be reduced by providing guidelines to users for solving, remedying, and/or troubleshooting the CEC errors.

In addition, because the sink device according to at least one example embodiment of the inventive concepts may identify the CEC error of the source device in real time and/or near-real time, it is possible to decrease and/or prevent the user from being confused and/or decrease and/or prevent the sink device from malfunctioning and/or becoming damaged due to the CEC error, etc.

FIG. 6 is a flowchart for explaining a method, performed by the sink device, of identifying a CEC error of one or more source devices according to at least one example embodiment of the inventive concepts.

Referring to FIG. 6, the sink device 100 may perform an HDMI communication connection with one or more source devices 10 (operation S110), but the example embodiments are not limited thereto. For example, referring to FIG. 4, the sink device 100 may connect the first source device 10 and the second source device 20 with the first and second HDMI cables HC1 and HC2, respectively, to perform HDMI communication connection (e.g., connecting the first source device 10 and the second source device 20 with the sink device 100 using HDMI cables, etc.), but is not limited thereto.

The sink device 100 may receive a CEC command CEC CMD provided from the outside, e.g., at least one external source, for example, the sink device 100 may receive a user input which causes the generation of a CEC command, etc. (operation S120), but is not limited thereto, and for example, the sink device 100 may internally generate the CEC command, etc. For example, referring to FIG. 2, the CEC command CEC CMD (e.g., power on, power off, volume up, volume down, mute, playback control, device priority, etc.) may be provided by a communication device, etc. (e.g., a smartphone, a remote control, etc.) of a user separately from the sink device 100 and the source device 10, but the example embodiments are not limited thereto. The nonvolatile memory 150 may store the CEC command CEC CMD provided from the outside, but the example embodiments are not limited thereto. The sink device 100 may transmit the received CEC command CEC CMD to the source device 10 and/or the source device 10 may also receive the same CEC command CEC CMD from the at least one external source, etc.

The sink device 100 may start monitoring for responses to the CEC command CEC CMD from the source devices 10 (operation S130). For example, referring to FIG. 2, the CEC driver 130 may start monitoring of a response to the CEC command CEC CMD (e.g., an action corresponding to the CEC command, such as powering off the source device 10, powering on the source device 10, transmission of AV content from the source device 10, discontinuing of transmission of AV content from the source device 10, etc.), receipt of status information and/or an acknowledgement message from the CEC driver 130A of the source device 10, etc., but the example embodiments are not limited thereto.

The sink device 100 may identify and/or retrieve data stored in the transmission TX state register 131 and/or the FIFO counter register 132 associated with one or more of the source devices 10 (operation S140), but is not limited thereto. For example, referring to FIG. 2, the CEC driver 130 may compare results output from the transmission state register 131 and/or the FIFO count register 132 associated with the one or more of the source devices 10 to identify the CEC error of one or more source devices 10.

The sink device 100 may store the connection state of each HDMI port and/or source devices 10 (operation S150). For example, referring to FIG. 2, the transmission state register 131 may store the connection state of each HDMI port of each source device 10, etc.

The sink device 100 may compare the CEC command monitoring time (e.g., the time spent monitoring for a response to the CEC command, etc.) with the desired threshold time (operation S160). For example, referring to FIG. 2, the CEC driver 130 may compare the CEC command CEC CMD monitoring time (e.g., the time period beginning from when the CEC command was transmitted to each source device 10 to the time when a response to the CEC command was received from each of the source devices 10, if any, etc.) to the desired threshold time for each source device 10. The CEC driver 130 may identify an error of the source device 10 that did not transmit a response to the CEC command CEC CMD within the desired threshold time, etc.

The sink device 100 may identify whether the CEC error identification of the source device has ended (operation S170) (e.g., determine whether another source device should be tested, etc.).

Figure 7:
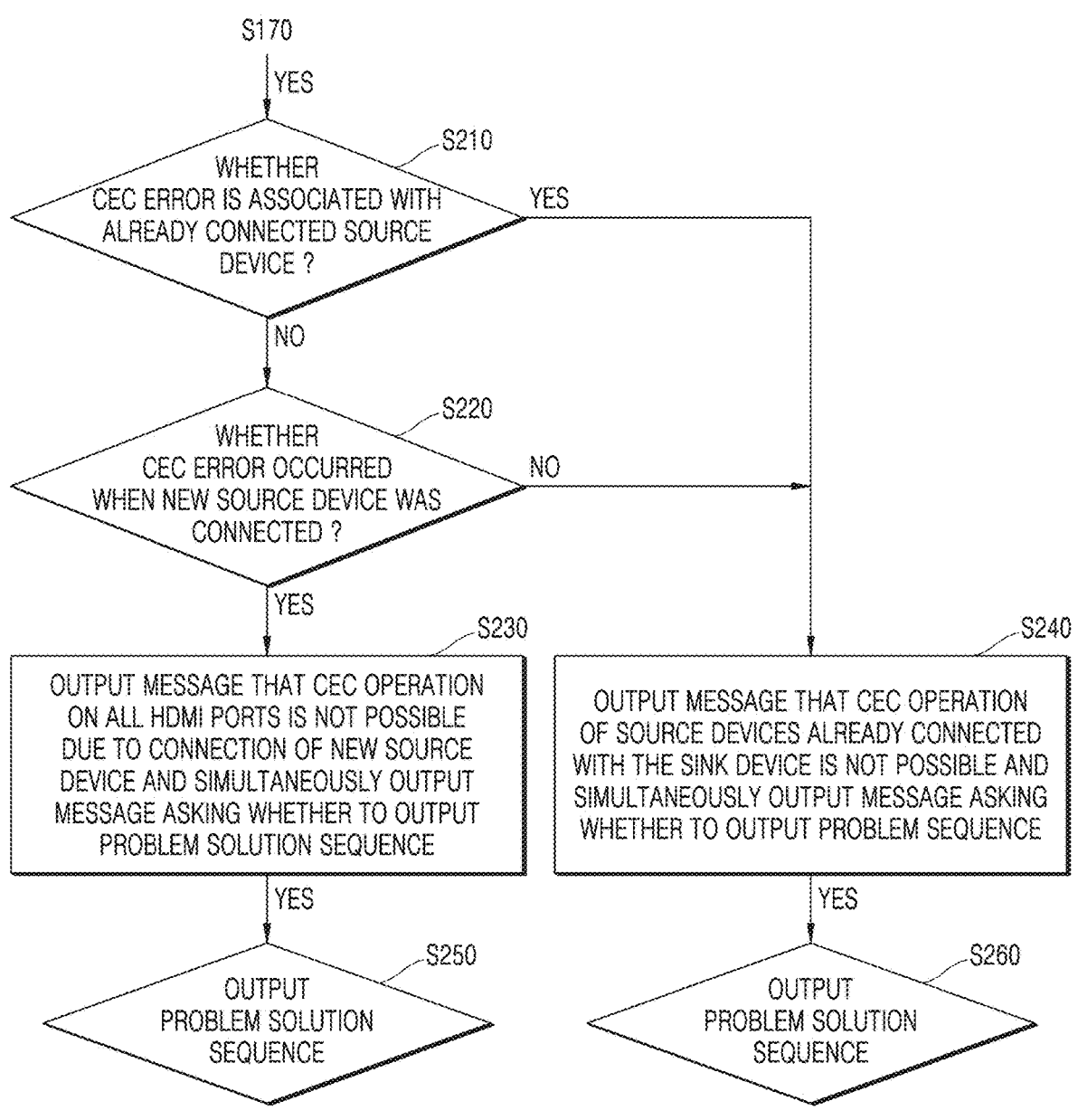
FIG. 7 is a flowchart for explaining a method, performed by the sink device, of analyzing the CEC error of each source device, according to at least one example embodiment of the inventive concepts.
Figure 8:
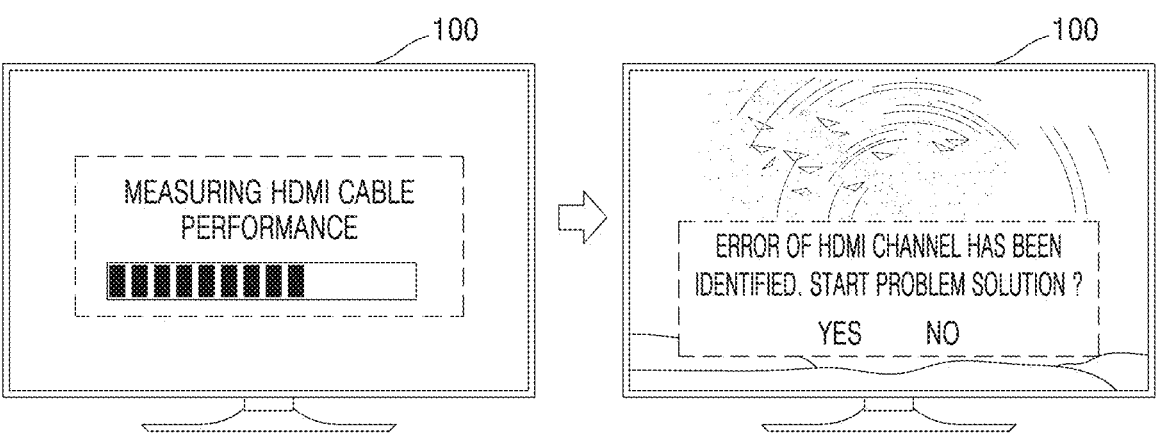
FIG. 8 is a diagram for explaining an example of a user interface (UI) output by the sink device, according to at least one example embodiment of the inventive concepts.

FIG. 7 is a flowchart for explaining a method, performed by the sink device, of analyzing the CEC error of each source device, according to at least one example embodiment of the inventive concepts. FIG. 8 is a diagram for explaining an example of a user interface (UI) output by the sink device 100 according to at least one example embodiment of the inventive concepts, but the example embodiments are not limited thereto.

Referring to FIG. 7, the sink device 100 may identify whether the CEC error (e.g., a CEC link stuck error, etc.) is associated with and/or corresponds to an already connected source device (operation S210).

If the CEC error does not correspond to and/or is not associated with an already connected source device (operation S210, NO), the sink device 100 may identify whether a CEC error occurred during the connection of (e.g., plugging in of) a new source device (operation S220).

If a CEC error occurred with the new source device (operation S220, YES), the sink device 100 may output that CEC operation of all of the HDMI ports is not currently possible because the new source device is connected, and may output and/or simultaneously output a message (e.g., an audio message and/or video message, etc.) asking whether to output the solution sequence performance (operation S230). For example, the sink device 100 may identify whether the CEC error is associated with and/or corresponds to the newly connected source device, and according to the identifying result, the sink device 100 may output interface information to notify the user of the CEC error and request whether or not to output the solution sequence associated with the identified error and/or identified source device, etc., but the example embodiments are not limited thereto, and for example, the sink device 100 may automatically output the solution sequence, etc.

If the CEC error is associated with and/or corresponds to the already connected source device (operation S210, YES), and no CEC error occurred in the new source device (operation S220, NO), the sink device 100 may output that the CEC operation of all of the HDMI ports is not currently possible and may output and/or simultaneously output a message (e.g., audio message and/or video message, etc.) asking the user whether to output the solution sequence performance (operation S240). For example, the sink device 100 may identify whether the CEC error is associated with and/or corresponds to the already connected source device, and according to the identifying result, the sink device 100 may output interface information to notify the user of the CEC error and request whether or not to output the solution sequence associated with the identified error and/or identified source device, etc., but the example embodiments are not limited thereto, and for example, the sink device 100 may automatically output the solution sequence, etc.

Referring to FIG. 8, according to at least one example embodiment, an electronic device may display, on a display unit of the sink device 100, a graphical user interface (GUI) message and/or visual message, etc., (such as "measuring HDMI cable performance", etc.) to notify the user that an error of the HDMI communication channel for each source device is being measured, etc., but the example embodiments are not limited thereto, and for example, the electronic device may provide a different form of indication, such as an audio message, a message transmitted to the external device and/or user's communication device, etc.

In addition, the electronic device may identify the CEC error of the HDMI communication channel of each source device, and accordingly, may for example, display on the display unit of the sink device 100, a GUI message and/or indication to the user (such as "An error has been identified in the HDMI channel. Would you like to start solving the problem? YES NO", etc.) to notify the user of the error of the HDMI communication channel, but the example embodiments are not limited thereto, and the electronic device may provide a different form of indication to the user. FIG. 8 shows at least one example embodiment and some example embodiments are not limited thereto.

Referring to FIG. 7 again, the output of the solution sequence of the new source device 10 may be selected (operation S250). The output of the solution sequence of the already connected source device 10 may be selected (operation S260).

For cases where the solution sequence performance of the new source device 10 is selected (operation S250, YES) or the solution sequence performance of the already connected source device 10 is selected, details will be described with reference to FIG. 9.

Figure 9:
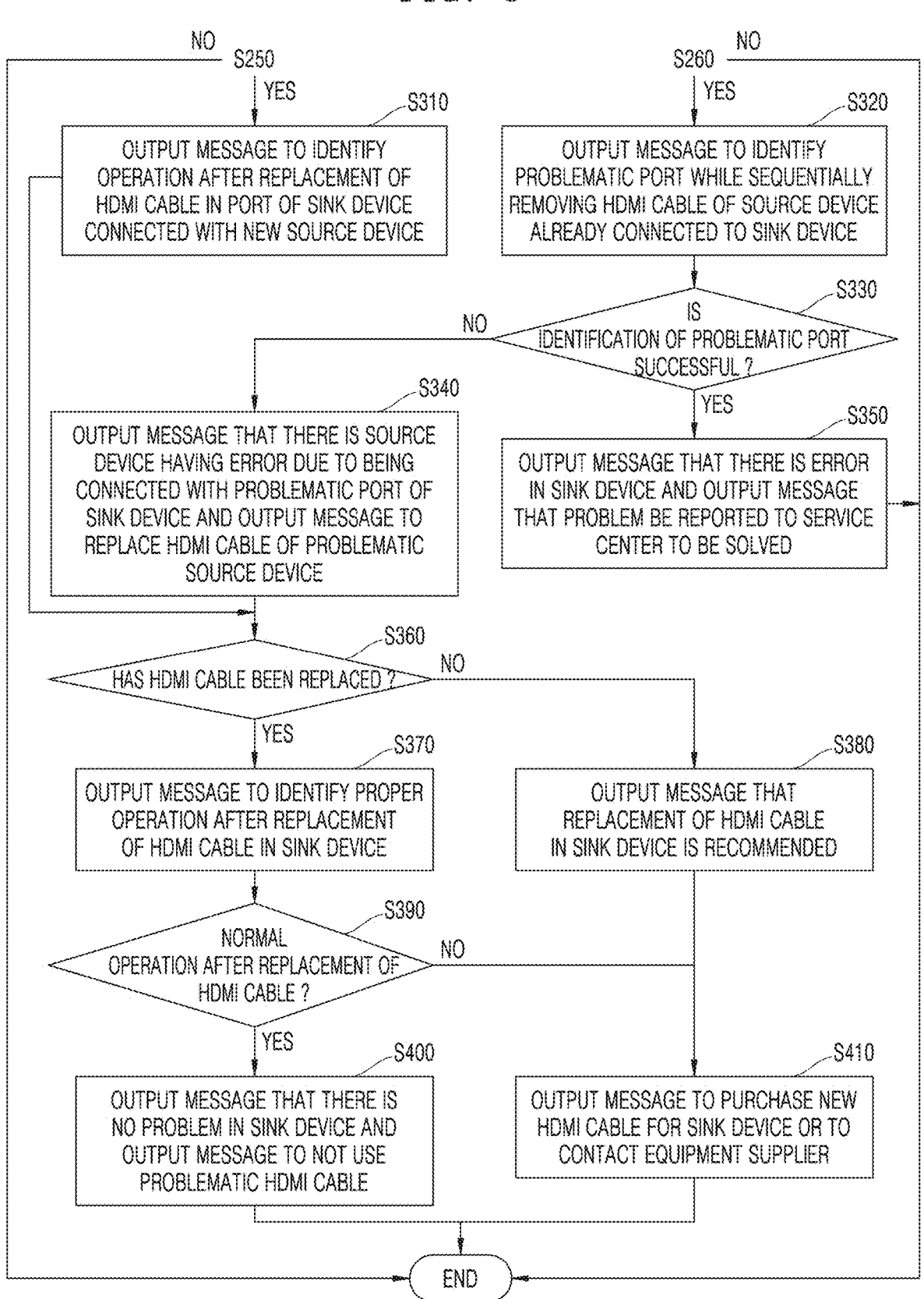
FIG. 9 is a flowchart for explaining a method, performed by the sink device, of providing a guideline to solve the CEC error of the source device, according to at least one example embodiment of the inventive concepts.
Figure 10:
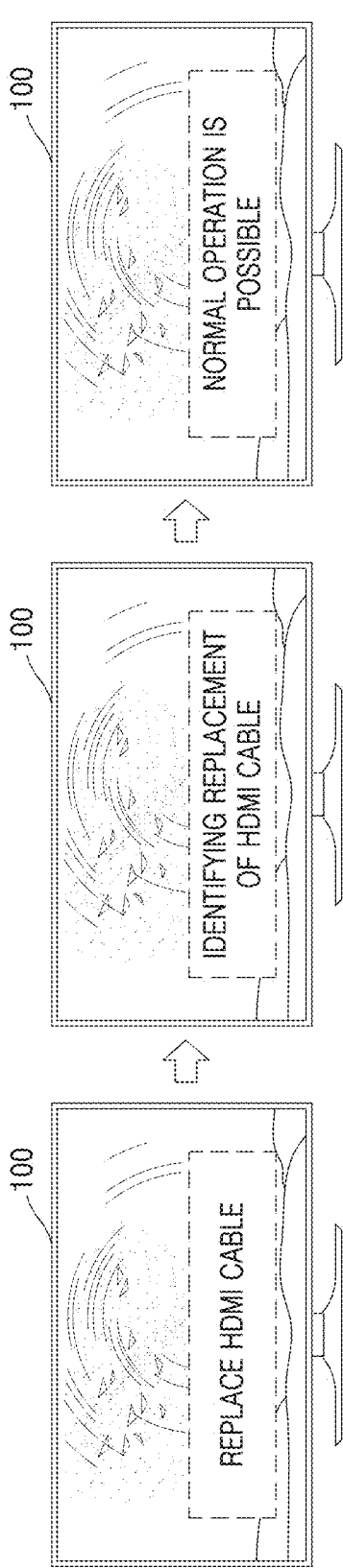
FIGS. 10 and 11 are diagrams for explaining an example of a UI output by the sink device, according to at least one example embodiment of the inventive concepts.
Figure 11:
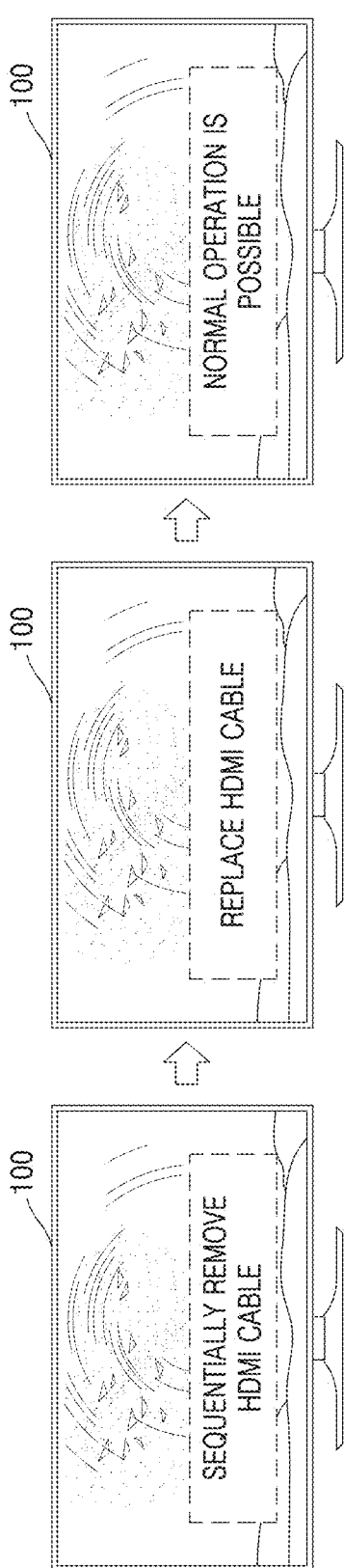

FIG. 9 is a flowchart for explaining a method, performed by the sink device, of providing a guideline to solve the CEC error of the source device, according to at least one example embodiment of the inventive concepts, but the example embodiments are not limited thereto, and for example, other solutions (e.g., troubleshooting instructions, etc.) may be provided to the user. FIGS. 10 and 11 are diagrams for explaining an example of a UI output by the sink device 100 according to at least one example embodiment of the inventive concepts, but the example embodiments are not limited thereto.

Providing a guideline to the user by the sink device 100 may include notifying the user of at least one CEC error which has occurred in one or more of the connected source devices and outputting GUI information and/or other information providing the solution sequence, etc., but the example embodiments are not limited thereto.

Referring to FIG. 9, for example, the sink device 100 may output a message indicating at least one operation to be performed after replacing the HDMI cable in the port connected to the new source device, etc., but the example embodiments are not limited thereto (operation S310).

Additionally, the sink device 100 may output a message to identify a problematic port while the HDMI cables are of the already connected source devices sequentially removed (operation S320).

The sink device 100 may determine whether the problematic port has been successfully identified (operation S330).

If the problematic port of the sink device has been successfully identified (S330, YES), the sink device 100 may output a message indicating that there is an error in the source device 10 and may output and/or simultaneously output a message that the user should report the problem to a service center to solve the problem (operation S350), etc., but the example embodiments are not limited thereto. For example, if the sink device 100 is able to communicate with the service center, e.g., through the Internet, etc., the sink device 100 may request permission from the user to transmit the error information to the service center, etc., but the example embodiments are not limited thereto.

If the identification of the problematic port of the sink device has failed (operation S330, NO), e.g., because the HDMI ports of the sink device 100 are performing properly, etc., the sink device 100 may output a message that the source device 10 associated with and/or corresponding to the detected CEC error has an error and output and/or simultaneously output a message to replace (e.g., disconnect and reconnect) the HDMI cable of the problematic source device (operation S340).

The sink device 100 may identify whether the HDMI cable is replaced (e.g., disconnected and reconnected) by the user (operation S360).

If the HDMI cable has been replaced (e.g., may be disconnected and reconnected, etc.) (operation S360, YES), the sink device 100 may output a message to determine whether the source device 10 operates properly after replacing the HDMI cable (operation S370), etc.

If the HDMI cable has not been replaced (operation S360, NO), the sink device 100 may output a message that the replacement (e.g., disconnect and reconnect) of the HDMI cable is desired, recommended, and/or necessary (operation S380).

The sink device 100 may output a message indicating whether the HDMI cable connected to the source device 10 operates normally after the replacement (e.g., disconnect and reconnect) (operation S390).

If the source device 10 operates normally, properly, and/or correctly, etc., (operation S390, YES), the sink device 100 may output a message indicating that there is no problem and output and/or simultaneously output a message to not use the problematic HDMI cable (operation S400).

If the source device 10 does not operate normally, properly, and/or correctly, etc. (operation S390, NO), the sink device 100 may output a message to purchase a new HDMI cable and/or to contact an equipment supplier (operation S410), etc., but the example embodiments are not limited thereto.

For example, referring to FIG. 4, the sink device 100 may output GUI information and/or output other forms of information to inform the user to replace the HDMI cable connected to the new source device, etc., but the example embodiments are not limited thereto. The sink device 100 may identify whether the new source device operates normally after the HDMI cable is replaced. The sink device 100 may output GUI information and/or other forms of information that notifies the user that the new source device operates normally, etc.

For example, referring to FIG. 4, the sink device 100 may output GUI information and/or other types of information to notify the user to sequentially remove the HDMI cable connected to each of the already connected source devices, but the example embodiments are not limited thereto. The sink device 100 may output GUI information and/or other types of information to notify the user to replace the HDMI cable, etc., but is not limited thereto. The sink device 100 may identify whether the source device in which the CEC error has been identified operates normally after the HDMI cable is replaced, etc. The sink device 100 may output GUI information and/or other types of information notifying the user that the source device in which the error has been identified is operating normally, etc., but is not limited thereto.

Referring to FIG. 10, according to at least one example embodiment, the sink device 100 may display a GUI message (such as "replace the HDMI cable", etc.) on the display unit and/or output other types of messages (e.g., audio messages, etc.) to notify the user to replace the HDMI cable of the source device in which the CEC error has been identified, but is not limited thereto.

The sink device 100 may display a GUI message (such as "HDMI cable replacement being identified", etc.) on the display unit and/or output other types of messages (e.g., audio messages, etc.) to notify the user that it is being identified whether the HDMI cable of the source device in which the CEC error has been identified has been replaced, but is not limited thereto.

The sink device 100 may display a GUI message (such as "normal operation is possible", etc.) on the display unit and/or output other types of messages (e.g., audio messages, etc.) to notify the user that the source device operates normally after the HDMI cable is replaced, etc., but is not limited thereto. For the sake of brevity and clarity, FIGS. 7 to 12 show and the corresponding description describe a single CEC error scenario, e.g., a CEC Line Stuck error, but the example embodiments are not limited thereto, and for example, other types of CEC errors may be identified and other problem solution sequence information and/or messages may be output, etc.

For example, referring to FIG. 4, when the CEC error is identified in the first source device 10, the sink device 100 may display a GUI message on the display unit and/or output other types of messages (e.g., audio messages, etc.) to notify the user to replace the first HDMI cable HC1 connected to the first source device 10, but is not limited thereto. The sink device 100 may display a GUI message on the display unit and/or output other types of messages (e.g., audio messages, etc.) to notify the user whether the replacement of the first HDMI cable HC1 connected with the first source device 10 has been detected, but is not limited thereto. The sink device 100 may display a GUI message on the display unit and/or output other types of messages (e.g., audio messages, etc.)

to notify the user that the first source device 10 operates normally after the first HDMI cable HC1 has been replaced, etc., but the example embodiments are not limited thereto.

Referring to FIG. 11, according to at least one example embodiment, the sink device 100 may display a GUI message (such as "sequentially remove the HDMI cables", etc.) on the display unit and/or provide other types of messages to notify the user to sequentially remove the HDMI cables of the source device in which the CEC error has been identified, etc., but is not limited thereto.

The sink device 100 may display a GUI message (such as "replace the HDMI cable", etc.) on the display unit and/or provide other types of messages to notify the user to replace the HDMI cable of the source device in which the CEC error has been identified, etc., but is not limited thereto.

The sink device 100 may display a GUI message (such as "normal operation is possible", etc.) on the display unit and/or provide other types of messages to notify the user that the source device operates normally after the HDMI cable is replaced, etc., but is not limited thereto. FIG. 11 shows at least one example embodiment, but the example embodiments are not limited thereto.

For example, referring to FIG. 4, when the CEC error is identified in the second source device 20, the sink device 100 may display a GUI message on the display unit, etc., to notify the user to sequentially eliminate the first HDMI cable HC1 connected with the first source device 10 and the second HDMI cable HC2 connected with the second source device 20, but the example embodiments are not limited thereto. The sink device 100 may display a GUI message on the display unit, etc., to notify the user to replace the second HDMI cable HC2 connected with the second source device 20, etc. The sink device 100 may display a GUI message on the display unit, etc., to notify the user whether the replacement of the second HDMI cable HC2 connected with the second source device 20 has been detected, etc. The sink device 100 may display a GUI message on the display unit, etc., to notify the user that the second source device 10 operates normally after the second HDMI cable HC2 was replaced, etc., but the example embodiments are not limited thereto.

According to at least one example embodiment of the inventive concepts, when the CEC error is identified in the source device, the sink device 100 may analyze whether the CEC error has occurred in any additional source devices and may provide a corresponding guideline (e.g., troubleshooting instructions, error information, etc.) for the user to solve, remedy, troubleshoot, etc., the CEC error in the one or more identified source devices, etc. Accordingly, response costs may be reduced by providing guidelines for solving the CEC errors to users, etc.

FIG. 12 is a flowchart for explaining a method, performed by the sink device, of identifying a CEC error of one or more source devices according to at least one example embodiment of the inventive concepts, but the example embodiments are not limited thereto.

Referring to FIG. 12, the CEC command CEC CMD may be transmitted from an external device (e.g., a smartphone, a server, a remote control, an AV control system, a touchpanel, etc.) to the sink device 100 (operation S610), but the example embodiments are not limited thereto. For example, the external device may be a separate device excluding the sink device and the source device, and for example, may be a communication apparatus, such as a remote control, a smartphone of a user, a computer, a server, an AV control system, etc., but is not limited thereto. The external device may transmit packet data and/or data length information (e.g., metadata, etc.) to the sink device 100, but the example embodiments are not limited thereto (operation S620).

The sink device 100 may receive data and/or the CEC command CEC CMD (operation S630), etc. The sink device 100 may identify whether the CEC driver 130 of the sink device 100 is in use (operation S640).

If the CEC driver 130 is not in use (operation S640, NO), the sink device 100 may end the operation of identifying the CEC error of each source device.

If the CEC driver 130 is in use (operation S640, YES), the sink device 100 may start CEC error monitoring (e.g., monitoring for CEC Line Stuck errors, etc.) for each connected source device (operation S650).

For example, the sink device 100 may monitor and/or identify whether the bit value assigned to the transmission state register 131 has changed, been modified, and/or has been updated, etc., (operation S660), but the example embodiments are not limited thereto.

If the assigned bit value has changed (operation S660, YES), the sink device 100 may determine whether the values of the data length and the FIFO counter register 132 are the same (operation S670).

If the assigned bit value is maintained without changing (e.g., have not been changed, modified, updated, etc.) (operation S660, NO), the sink device 100 may end the monitoring operation (operation S700).

If the values of the data length and the FIFO counter register 132 are the same (operation S670, YES), the sink device 100 may determine whether the CEC monitoring time for responding to the CEC command (e.g., a response time period, etc.) exceeds the desired threshold time (operation S680).

If the values of the data length and the FIFO counter register 132 are not the same (operation S670, NO), the sink device 100 may end the monitoring operation (operation S700).

If the CEC response time period exceeds the desired threshold time (operation S680, YES), the sink device 100 may output GUI message and/or other types of messages with information to notify the user that there is an error in the source device (operation S690).

If the CEC response time period does not exceed the desired threshold time (operation S680, NO), the sink device 100 may end the monitoring operation (operation S700).

Figure 13:
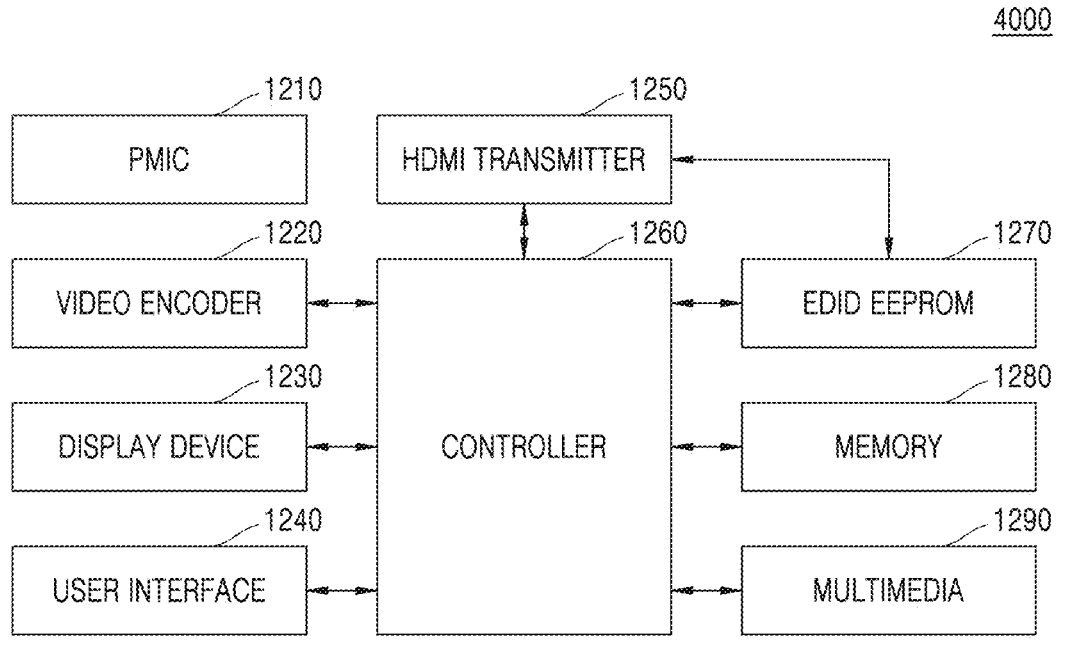
FIG. 13 is a diagram for explaining an electronic device according to at least one example embodiment of the inventive concepts.

FIG. 13 is a diagram for explaining an electronic device 4000 according to at least one example embodiment of the inventive concepts.

Referring to FIG. 13, the electronic device 4000 may correspond to the sink device 100 of FIG. 1, but the example embodiments are not limited thereto. The electronic device 4000 may include a power management integrated circuit (PMIC) 1210, a video encoder 1220, a display device 1230, a user interface 1240, an HMDI transmitter 1250, a controller 1260, an EDID EEPROM 1270, a memory 1280, and/or multimedia 1290, etc., but the example embodiments are not limited thereto, and for example, the electronic device 4000 may include a greater or lesser number of constituent components, etc. According to some example embodiments, the PMIC 1210, the video encoder 1220, the user interface 1240, the HMDI transmitter 1250, the controller 1260, the EDID EEPROM 1270, the memory 1280, and/or the multimedia 1290, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The PMIC 1210 may receive power from an outside source and/or external source (e.g., a battery, a power outlet, etc.) and supply operation power to each element (e.g., a video encoder 1220, a display device 1230, a user interface 1240, an HMDI transmitter 1250, a controller 1260, EDID EEPROM 1270, a memory 1280, multimedia 1290, etc.).

The video encoder 1220 may compress, decompress, and/or process image data received through the HDMI transmitter 2150, but is not limited thereto.

The controller 1260 may control the display device 1230 to display data of various videos such as content data, UI data, etc. The display device 1230 may include a display panel, an injection driving unit, a timing controller, a data driver, etc. For example, the display device 1230 may be implemented as a liquid crystal display (LCD), a light-emitting diode (LED) display, an organic LED (OLED) display, an active-matrix OLED (AMOLED) display, or a flexible display.

The user interface 1240 may be implemented as a remote controller, a voice receiving/recognition device, a touch input sensing/receiving device, etc.

The HDMI transmitter 1250 may correspond to the HDMI transmitter 110 shown in FIG. 2, but the example embodiments are not limited thereto.

The controller 1260 may control the video encoder 1220, the display device 1230, the user interface 1240, the HMDI transmitter 1250, the EDID EEPROM 1270, the memory 1280, and/or the multimedia 1290, etc. The controller 1260 may be a portion of the SoC 120 shown in FIG. 1, but the example embodiments are not limited thereto.

The EDID EEPROM 1270 refers to EEPROM that may store EDID, but the example embodiments are not limited thereto.

The memory 1280, which is a storage medium for storing data, programs, and/or instructions, etc., may store an operating system (OS), various programs, and/or a variety of data, etc. The memory 1280 may be, for example, DRAM but is not limited thereto. For example, the memory 1280 may be a non-volatile memory device (e.g., flash memory, phase change RAM (PRAM), magnetic RAM (MRAM), resistive ram (RRAM), and/or a FeRAM device, etc.). The memory 1280 may correspond to the cache memory 140 shown in FIG. 2, but the example embodiments are not limited thereto.

Figure 14:
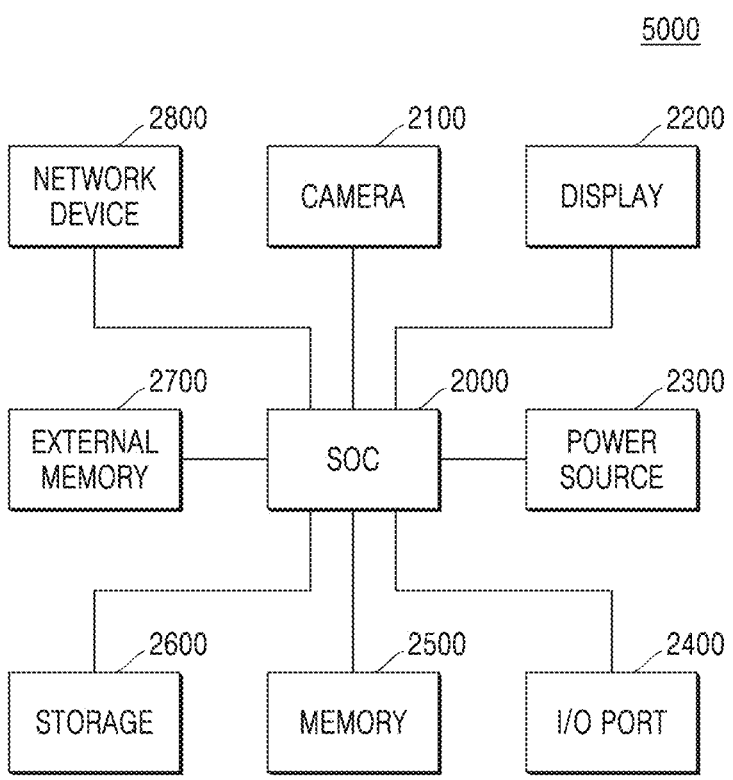
FIG. 14 is a diagram for explaining an electronic device according to at least one example embodiment of the inventive concepts.

FIG. 14 is a diagram for explaining an electronic device 5000 according to at least one example embodiment of the inventive concepts.

Referring to FIG. 14, the electronic device 5000 may be implemented as a personal computer (PC), a smartphone, a tablet, a laptop, a data server, a gaming console, and/or portable electronic device, etc., but the example embodiments are not limited thereto.

The electronic device 5000 may include an SoC 2000, a camera device 2100, a display 2200, a power source 2300, an input/output port 2400, a memory 2500, a storage 2600, an external memory 2700, and/or a network device 2800, etc. According to some example embodiments, the SoC 2000, the input/output port 2400, the memory 2500, and/or the network device 2800, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The SoC 2000 may correspond to the SoC 120 shown in FIG. 1. The SoC 2000 may communicate with the camera device 2100, the display 2200, the power source 2300, the input/output port 2400, the memory 2500, the storage 2600, the external memory 2700, and/or the network device 2800, etc. The SoC 2000 may process signals to be input to the camera device 2100, the display 2200, the power source 2300, the input/output port 2400, the memory 2500, the storage 2600, the external memory 2700, and/or the network device 2800, but the example embodiments are not limited thereto.

The camera device 2100 refers to a device including an image sensor that may convert an optical image to an electrical image. Thus, the electrical image output from the camera device may be stored in the storage 2600, the memory 2500, and/or the external memory 2700, etc. In addition, the electrical image output from the camera device may be displayed on the display 2200.

The display 2200 may display data output from the storage 2600, the memory 2500, the input/output port 2400, the external memory 2700, and/or the network device 2800, etc.

The power source 2300 may supply a driving voltage to at least one of the elements of the electronic device 5000. The power source 2300 may be controlled by the power management integrated circuit (PMIC), but is not limited thereto.

The input/output port 2400 may be a port that may receive data for the electronic device 5000 and/or transmit data output from the electronic device 5000 to at least one external device. For example, the input/output port 2400 may be a port to access a pointing device such as a computer mouse, a port to access a printer, and/or a port to access a USB drive, etc.

The memory 2500 may be implemented as a volatile memory and/or a non-volatile memory. According to at least one example embodiment, a memory controller that may control data access operation to the memory 2500, such as a read operation, a write operation (and/or program operation), and/or an erase operation, etc., and may be integrated and/or embedded in the SoC 2000, but is not limited thereto. According to at least one example embodiment, the memory controller may be implemented between the SoC 2000 and/or the memory 2500.

The storage 2600 may be implemented as a hard disk drive and/or a solid state drive (SSD), etc., but is not limited thereto.

The external memory 2700 may be implemented as a secure digital (SD) card and/or a multimedia card (MMC), etc., but is not limited thereto. In at least one example embodiment, the external memory 2700 may be an external hard drive, an external SSD, a subscriber identification module (SIM) card and/or a universal subscriber identity module (USIM) card, etc.

The network device 2800 refers to a device (e.g., a modem, etc.) that may connect the electronic device 5000 with a wired network and/or a wireless network.

Figure 15:
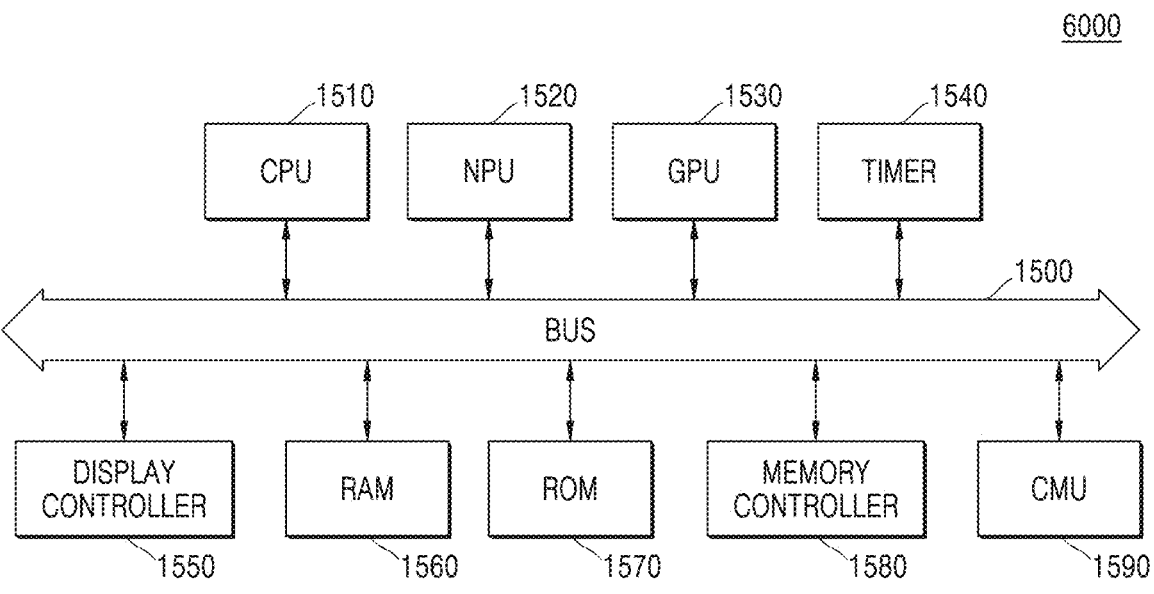
FIG. 15 is a diagram for explaining a system on chip according to at least one example embodiment of the inventive concepts.

FIG. 15 is a diagram for explaining a SoC 6000 according to at least one example embodiment of the inventive concepts.

Referring to FIG. 15, the SoC 6000 may include a central processing unit (CPU) 1510, a neural network processing unit (NPU) 1520, a graphics processing unit (GPU) 1530, a timer 1540, a display controller 1550, a random access memory (RAM) 1560, read only memory (ROM) 1570, a memory controller 1580, a clock management unit (CMU) 1590, and/or a bus 1500, etc. The Soc 6000 may further include other elements in addition to the elements shown and/or may omit elements shown in FIG. 15. According to some example embodiments, the CPU 1510, the NPU 1520, the GPU 1530, the timer 1540, the display controller 1550, the RAM 1560, the read only memory ROM 1570, the memory controller 1580, the CMU 1590, and/or a bus 1500, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The CPU 1510 may also be called a processor, and may process and/or execute programs and/or data stored in the external memory, but is not limited thereto. For example, the CPU 1510 may process and/or execute programs and/or data, etc., in response to the operation clock signal output from the CMU 1590.

The CPU 1510 may be implemented as a multi-core processor, but is not limited thereto. The multi-core processor is a computing component including two or more independent processors (called "cores"), and each processor may read and/or execute program instructions. Programs and/or data stored in the ROM 1570, RAM 1560, and/or the memory 1280 may be loaded to the memory (not shown) of the CPU 1510 as desired and/or needed.

The NPU 1520 may use an artificial neural network to effectively process large-scale operations, but the example embodiments are not limited thereto. For example, the NPU 1520 may perform deep learning by supporting simultaneous matrix operations, but is not limited thereto.

The GPU 1530 may convert data read by the memory controller 1580 from the external memory and/or internal memory (e.g., RAM 1560, etc.) into a signal suitable for the display device 1550, etc.

The timer 1540 may output a count value indicating time based on an operation clock signal output from the CMU 1590, but is not limited thereto.

The display controller 1550 may control the operation of at least one external display device.

The RAM 2120 may temporarily store programs, data, and/or instructions. For example, the programs and/or data stored in the memory may be temporarily stored in the RAM 1560 according to the control of the CPU 1510 and/or according to a booting code stored in the ROM 1570, etc. The RAM 1560 may be implemented as a dynamic RAM (DRAM) and/or a static RAM (SRAM), but is not limited thereto.

The ROM 1570 may store permanent programs and/or data. The ROM 1570 may be implemented as an EPROM and/or an EEPROM, etc.

The memory controller 1580 may communicate with an external memory through an interface, but is not limited thereto. The memory controller 1580 may control the operation of the external memory in general and control a data exchange between a host and the external memory. For example, the memory controller 1580 may use data in the external memory and/or read data from the external memory at the request of the host, etc. Here, the host may refer to a master device such as the CPU 1510, the GPU 1530, and/or the display controller 1550, etc.

The CMU 1590 provides an operation clock signal. The CMU 1590 may include a clock signal providing device such as a phase locked loop (PLL), a delayed locked loop (DLL), and/or a crystal oscillator, etc. The operation clock signal may be provided to the GPU 1530, but is not limited thereto. The operation clock signal may be provided to other elements (e.g., the CPU 1510, the memory controller 1580, etc.). The CMU 1590 may change the frequency of the operation clock signal.

Each of the CPU 1510, the NPU 1520, the GPU 1530, the timer 1540, the display controller 1550, the RAM 1560, the ROM 1570, the memory controller 1580, and/or the CMU 1590, etc., may communicate with each other through the bus 1500.

While various example embodiments of the inventive concepts have been particularly shown and described above, it will be understood that various changes in form and details may be made therein without departing from the spirit and scope of the following claims.

What is claimed is:

1. An operating method of an electronic device configured to communicate with one or more source devices through a high-definition multimedia interface (HDMI), the method comprising:

identifying a consumer electronics control (CEC) error corresponding to the one or more source devices based on CEC communication status between the electronic device and the one or more source devices;

analyzing the identified CEC error corresponding to the one or more source devices using at least one error identification algorithm; and providing troubleshooting information to a user of the electronic device regarding the identified CEC error corresponding to the one or more source devices based on results of the analyzing.

2. The method of claim 1, wherein the identifying of the CEC error of the one or more source devices comprises:

receiving a CEC command provided from an external source;

transmitting the received CEC command to the one or more source devices;

determining whether a response to the CEC command was received from the one or more source devices within a desired threshold time period; and identifying the CEC error corresponding to the one or more the source devices based on results of the determining.

3. The method of claim 2, wherein the identifying of the CEC error corresponding to the one or more source devices comprises:

determining whether the one or more source devices is are toggleable; and identifying the CEC error of the one or more source devices based on whether the one or more source devices are toggleable.

4. The method of claim 2, wherein the identifying of the CEC error of the one or more source devices comprises:

determining whether the CEC error occurred based on a bit value allocated to the CEC command.

5. The method of claim 1, wherein the analyzing of the identified CEC error comprises:

identifying whether the identified CEC error corresponds to a previously connected source device of the one or more source devices using the at least one error identification algorithm; and outputting first troubleshooting information to the user as the troubleshooting information in response to the identified CEC error corresponding to the previously connected source device, the first troubleshooting information notifying the user of the identified CEC error and asking the user whether or not to output a first solution sequence associated with the identified CEC error.

6. The method of claim 1, wherein the analyzing of the identified CEC error comprises:

identifying whether the identified CEC error corresponds to a newly connected source device of the one or more source devices; and outputting second troubleshooting information to the user as the troubleshooting information in response to the identified CEC error corresponding to the newly connected source device, the second troubleshooting information notifying the user of the identified CEC error and asking the user whether or not to output a second solution sequence associated with the identified CEC error.

7. The method of claim 1, wherein the providing of the troubleshooting information comprises:

outputting a notification to the user of the identified CEC error corresponding to the one or more source devices; and providing a solution sequence associated with the identified CEC error.

8. The method of claim 7, wherein the notification further includes a notification to the user to replace an HDMI cable connected with a newly connected source device of the one or more source devices; and the method further comprises, determining whether the newly connected source device operates normally after a HDMI cable connecting the newly connected source device and the electronic device has been replaced; and outputting the notification, the notification including a notification to the user that the newly connected source device operates properly.

9. The method of claim 7, wherein the providing of the troubleshooting information further comprises:

outputting the notification, the notification further including a notification to the user to sequentially remove HDMI cables connected with one or more already connected source devices of the one or more source devices;

outputting the notification, the notification further including a notification to the user to replace the HDMI cable connected with the source device in which an error was identified;

detecting whether the HDMI cable connected with the source device in which an error was identified has been replaced;

determining whether the source device in which the error was identified operates normally in response to results of the detecting whether the HDMI cable has been replaced; and outputting the notification, the notification further including a notification to the user that the source device in which the error was identified operates properly.

10. An electronic device configured to communicate with one or more source devices through a high-definition multimedia interface (HDMI), the electronic device comprising:

a nonvolatile memory configured to store a consumer electronic control (CEC) command received from an external source;

a volatile memory configured to temporarily store the CEC command; and processing circuitry configured to identify a CEC error of the one or more source devices based on the stored CEC command, the processing circuitry including, a transmission state register configured to store a state of the CEC command, and a first-in-first-out (FIFO) count register configured to count a number of responses to the CEC command received from the one or more source devices, and the processing circuitry is further configured to, identify the CEC error of the one or more source devices by comparing results output on the transmission state register associated with the CEC command and the FIFO count register, analyze the identified CEC error corresponding to the one or more source devices, and based on a result of the analyzing, provide troubleshooting information to a user of the electronic device regarding the identified CEC error corresponding to the one or more source devices.

11. The device of claim 10, wherein the processing circuitry is further configured to:

transmit the CEC command to the one or more source devices;

determine whether a response to the CEC command was received from the one or more source devices within a desired threshold time period; and identify the CEC error corresponding to the one or more source devices based on results of the determination.

12. The device of claim 11, wherein the processing circuitry is further configured to:

identify whether the one or more source devices are toggleable; and identify the CEC error of the one or more source device based on whether the one or more source devices are toggleable.

13. The device of claim 10, wherein the processing circuitry is further configured to:

determine whether the identified CEC error occurred based on a bit value allocated to the CEC command.

14. The device of claim 10, wherein the processing circuitry is further configured to:

identify whether the CEC error corresponds to a previously connected source device of the one or more source devices; and output first troubleshooting information to the user as the troubleshooting information in response to the identified CEC error corresponding to the previously connected source device, the first troubleshooting information notifying the user of the identified CEC error and asking the user whether or not to output a first solution sequence associated with the identified CEC error.

15. The device of claim 10, wherein the processing circuitry is further configured to:

identify whether the identified CEC error corresponds to a newly connected source device of the one or more source devices; and output second troubleshooting information to the user as the troubleshooting information in response to the identified CEC error corresponding to the newly connected source device, the second troubleshooting information notifying the user of the identified CEC error and asking the user whether or not to output a second solution sequence associated with the identified CEC error.

16. The device of claim 10, wherein the processing circuitry is further configured to:

output a notification to the user of the identified CEC error corresponding to the one or more source devices; and provide a solution sequence associated with the identified CEC error.

17. The device of claim 16, wherein the processing circuitry is further configured to:

output the notification, the notification including a notification to the user to replace an HDMI cable connected with a newly connected source device of the one or more source devices;

identify whether the newly connected source device operates normally in response to determining that the HDMI cable connected with the newly connected source device has been replaced; and output to the notification, the notification including a notification to the user that the newly connected source device operates properly.

18. The device of claim 16, wherein the processing circuitry is further configured to:

output the notification to the user, the notification further including a notification to the user to sequentially remove HDMI cables connected with each previously connected source device of the one or more source devices;

output the notification to the user, the notification further including a notification to the user to replace the HDMI cable connected with the one or more source devices corresponding to the CEC error;

identify whether the one or more source devices corresponding to the CEC error operates properly in response to determining that the HDMI cable connected with the previously connected source device has been replaced; and output the notification to the user, the notification further including a notification to the user that the identified source devices operates normally.

19. An operating method of an electronic device, the electronic device configured to communicate with a first source device and a second source device through a high-definition multimedia interface (HDMI), the method comprising:

identifying a consumer electronic control (CEC) error of the first source device and the second source device based on the communication between the electronic device, the first source device, and the second source device;

analyzing the identified CEC errors of the first source device and the second source device using at least one error identification algorithm; and providing troubleshooting information to a user of the electronic device regarding the identified CEC errors of the first source device and the second source device based on results of the analysis.

20. The method of claim 19, wherein the identifying of the CEC errors of the first source device and the second source device comprises:

receiving a CEC command provided from an external source;

transmitting the received CEC command to the first source device and the second source device;

determining whether a response to the CEC command was received from the first source device and the second source device within a desired threshold time period; and identifying the CEC errors of the first source device and the second source device based on results of the determining.

* * * * *